United States Patent
Xiong et al.

(10) Patent No.: US 12,430,586 B1
(45) Date of Patent: Sep. 30, 2025

(54) GENERATING HIGH-FIDELITY PREDICTIONS OF CHANGES TO CODED DATA RECORDS

(71) Applicants: Carnegie Mellon University, Pittsburgh, PA (US); Georgetown University, Washington, DC (US)

(72) Inventors: Chenyan Xiong, Pittsburgh, PA (US); Liwen Sun, Pittsburgh, PA (US); Hao-Ren Yao, Pittsburgh, PA (US); Ophir Frieder, Washington, DC (US)

(73) Assignees: Carnegie Mellon University, Pittsburgh, PA (US); Georgetown University, Washington, DC (US)

( * ) Notice: Subject to any disclaimer, the term of this patent is extended or adjusted under 35 U.S.C. 154(b) by 0 days.

(21) Appl. No.: 19/200,280

(22) Filed: May 6, 2025

Related U.S. Application Data

(60) Provisional application No. 63/751,657, filed on Jan. 30, 2025.

(51) Int. Cl.
*G06F 7/00* (2006.01)
*G06N 20/00* (2019.01)

(52) U.S. Cl.
CPC .................................. *G06N 20/00* (2019.01)

(58) Field of Classification Search
CPC ...... G06F 16/256; G06F 16/22; G06F 16/217; G06F 16/24553; G06F 16/24578; G06F 16/24; G06F 16/13; G06F 16/2272; G06F 16/2425; G06F 16/2428; G06F 16/2455; G06F 16/248; G06F 16/14; G06F 16/38; G06F 16/334; G06F 16/35; G06N 20/00; G06N 5/04; G06N 3/0475; G06N 3/0455; G06N 3/044; G06N 3/045

See application file for complete search history.

(56) References Cited

U.S. PATENT DOCUMENTS

| | | | |
|---|---|---|---|
| 12,259,864 B1 * | 3/2025 | Aravamudan | G16H 50/70 |
| 2023/0017734 A1 * | 1/2023 | Singh | G06F 40/20 |
| 2023/0245485 A1 * | 8/2023 | Rimchala | G06V 30/413 382/176 |
| 2024/0281705 A1 * | 8/2024 | Liu | G06N 20/00 |
| 2025/0078827 A1 * | 3/2025 | Xu | G10L 15/16 |
| 2025/0206330 A1 * | 6/2025 | Gong | G06V 10/40 |

* cited by examiner

*Primary Examiner* — Mohammad A Sana
(74) *Attorney, Agent, or Firm* — Fish & Richardson P.C.

(57) ABSTRACT

Systems and processes described herein are for monitoring data records and predicting changes to coded values in the data records. More specifically, this disclosure relates to predicting and potentially preventing anomalies represented in data records by predicting values of entries to be added to the data records and causing a prophylactic response to the predicted anomaly to prevent the anomaly from occurring.

20 Claims, 14 Drawing Sheets

Controlled Negatives

Random Negatives

Sensitivity

Specificity

Sensitivity

MSE Error

GENERATING HIGH-FIDELITY PREDICTIONS OF CHANGES TO CODED DATA RECORDS

CLAIM OF PRIORITY

This application claims priority to U.S. Patent Application Ser. No. 63/751,657, filed on Jan. 30, 2025, the entire contents of which are hereby incorporated by reference.

TECHNICAL FIELD

The present disclosure relates to monitoring data records and predicting changes to coded values in the data records. More specifically, this disclosure relates to predicting anomalies represented in data records by predicting values of entries to be added to the data records and causing a prophylactic response to the predicted anomaly to prevent the anomaly from occurring.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

Computer systems can be configured to monitor operations and provide data representing those operations as a response to a request for data. The data representing those operations can be in the form of data records. In some cases, the data records may not directly indicate that an anomaly has occurred or will occur, and the anomaly may only be detectable by interpreting one or more values of the data records. When values in the data records follow particular patterns, it may represent a potential future anomaly.

SUMMARY

This disclosure describes systems and methods for predicting anomalies in coded data records by generating high-fidelity predictions of changes to coded data records that indicate the anomaly is occurring. The prediction, made with an accuracy of 99% or better, indicates that a coded value representing an anomaly will occur in a future update to the data record if no action is taken. In this disclosure, an anomaly refers to an undesirable consequence or condition occurring in an entity, such as in a computing system, device, machine, person, or other entity. The anomaly can represent a failure of the machine to perform a task, a health and safety risk to a person, a disease condition in a person, or other such condition. For example, the coded value in the data record can represent a fault, error state, disease condition, and so forth.

The systems and methods described herein are configured to detect patterns indicative of a future anomaly in data records, such as when the data records are updated. The data processing system can determine when a set of values in one or more data records corresponds to pattern in which the anomaly occurred in the past. A data processing system can screen for a particular anomaly by testing the data records against previous examples in which the particular anomaly occurred. When the data processing system determines that values in the data record sufficiently correspond to patterns that previously resulted in the particular anomaly, the data processing system can predict that the data record will be updated with a subsequent value (or values) representing the occurrence of the particular anomaly in the future. The data processing system can then cause an immediate mitigation action to be taken to reduce a likelihood or eliminate a cause of the anomaly occurring.

The data processing system is configured to pretrain machine learning models on data associated with each anomaly that the data processing system is screening in the data records. The data processing system is configured to tokenize the data records into token sequences. The data processing system trains a given model using a set of token sequences that include a token (or tokens) representing a particular anomaly. When processing new data records, the data processing system is configured to tokenize the data record into a new token sequence and predict whether the token (or tokens) will occur at particular locations within the token sequence. Given the training sequences, the data processing system can predict that a given token or tokens will occur with a very high level of confidence. The presence of the token (or tokens) is validated as representing the actual occurrence of the anomaly in the system, device, or person with an accuracy of over 99%, resulting in a high-fidelity prediction. In some critical systems, this high-fidelity prediction must be reliable in avoiding false-negatives in which potential anomalies are not predicted when in reality they will occur, as subsequently described. The processes and data processing system described herein ensure that the prediction has this high-fidelity for each anomaly condition being screened.

The systems and processes described herein can enable one or more of the following advantages. The data processing systems described herein are configured to execute in resource-constrained environments with low available computing power (e.g., end user client systems without cloud-based support). The data processing system processes the individual records using pretrained models that require minimal computing footprints for storage and execution. The data processing system can store a specialized model for each anomaly condition, ensuring a high-fidelity prediction of the occurrence of an anomaly.

In some implementations, the systems and processes described herein can detect anomalies in computing systems from data logs. For example, a process for processing a data stream to identify a structure of the data stream includes receiving the data stream including at least one log message, each log message including a sequence of characters. The process includes retrieving, from a data storage, a set of rules for encoding log message characters into at least one token. The process includes parsing the at least one log message as the at least one log message is received. Generally, parsing includes generating a plurality of tokens according to at least one rule of the set of rules. In some implementations, each token represents a corresponding portion of the sequence of characters of the at least one log message. The parsing includes forming a sequence of tokens from the plurality of tokens. The parsing includes assigning, to at least one token of the sequence of tokens, at least one attribute value describing the corresponding portion of the sequence of characters of the corresponding token to which the attribute value is assigned. The sequence of tokens may correspond to a pattern by which the anomaly being screened is characterized. The data processing system may indicate that a token (or tokens) will occur in the token sequence, wherein the token (or tokens) represent values in the data record that in turn correspond to the presence of an anomaly in the computing system. In this example, the anomaly could include processing overload, bandwidth saturation for a computing cluster, hardware failure for a computing device, sensor, or other device, and so forth. The data processing system can predict that the anomaly will occur and cause a mitigation action to be performed. The mitigation action can include rebalancing processing load, indicting hardware replacement should occur, quarantining operations from the affected system or device, and so forth.

In some implementations, the data processing systems described herein can be tailored to predict disease conditions in patients from medical records. In an example, the data processing system can screen medical records to predict that data values will be added that correspond to a cancer condition that may be present in a patient. Generally, the best way to combat cancer is to detect it as early as possible. Existing cancer screening methods can require illusive, expensive and intrusive medical procedures not widely performable. The data processing system can generate an alert of a cancer risk solely based on patients' past medical records. The data processing system can be pretrained on millions of patients' healthcare records with billions of medical events, bringing the benefits of scale to healthcare data, and finetuned on clinician curated cancer screening datasets. The data processing system can be trained to detect specific cancers, such as pancreatic, liver, and lung cancers. In these examples, the data processing system can achieve 99% specificity and over 60% sensitivity, resulting in increased survival for patients when mitigation actions are subsequently performed. In addition to cancer conditions, other heath anomalies can be detected. For example, cardiac arrhythmia or failure can be predicted from real-time data (and medical records) including heart rate, blood pressure, blood-oxygen levels, brain ischemia, Intracranial hemorrhage (ICH), and so forth. As these values change over time, the data processing system can determine when a disease condition (such as heart disease) will occur.

The data processing system can detect disease conditions at high scale and at low cost for a wide variety of potential diseases. For example, the data processing system can screen for heart conditions, strokes, and cancers without using invasive screening tests or requiring additional data that are not present within an existing data record for a patient. When a disease condition is predicted, the patient can then validate the finding with additional testing, saving time and resources of unnecessary tests. As stated previously, the specificity of the model for certain cancers is over 99% (enabling live-saving anomaly mitigation at an earlier stage) and the sensitivity is over 60% (enabling large reductions in unnecessary tests for patients without the disease condition). The cost of executing the model on the data record is much lower than performing invasive screening tests for the patient, enabling substantial cost savings. Medical service providers can focus resources on patients flagged as likely to have the disease condition with a low risk of missing patients for screening who in fact have (or will have) the disease condition.

The data processing system uses machine learning models that do not require complex training or comprehensive language mapping to occur to be effective. Rather, the data processing system uses machine learning models that can be trained on standard medical records which encode medical events such as diagnoses, procedures, and medications. The machine learning models include transformer decoders that are built on the International Classification of Diseases (ICD) code sequences of healthcare records. The machine learning models use an autoregressive next ICD code prediction task. ICD codes include alphanumeric codes used to classify and code diagnoses, symptoms, and procedures in healthcare, facilitating accurate billing, data analysis, and research. The ICD code prediction corresponds to the presence of a disease condition in a patient.

The one or more advantages described herein can be enabled by the one or more aspects, embodiments, or implementations described herein, such as the following.

In an aspect, a monitoring system for determining a presence or absence of anomalies in an entity for prevention or mitigation the anomalies includes one or more sensors configured to generate operational data describing operation of components of an entity; and a computing system comprising one or more processors in communication with the one or more sensors, the one or more processors configured to perform operations. The operations include receiving the operational data from the one or more sensors; generating, based on the operational data, a keyed data record including fields and values representing events that describe operation of the components of the entity; extracting, from the keyed data record, a set of fields and values associated with a subset of coded data values; generating a token sequence representing the set of fields in the keyed data record, a first token of the token sequence representing an event, and a second token representing a coded data value associated with the event of the first token, the first token and the second token being associated with each other in the sequence of tokens; generating one or more predicted next tokens of the token sequence by applying machine learning logic of a machine learning model to the token sequence, the machine learning model being trained using a tokenized set of data records each including a particular coded data value; determining whether the one or more predicted next tokens include the particular coded data value; and generating a classification output representing the prediction of the coded data value being added to the data record.

In some implementations, the prediction of the coded value being added to the data record represents a prediction of a presence or an absence of an anomaly in operation of a component of an entity associated with the data record, the anomaly corresponding to the coded data value.

In some implementations, the operations further include, when the prediction indicates a presence of an anomaly, causing mitigation or prevention of the anomaly by changing an operation of a component of the entity. In some implementations, changing an operation of a component of the entity comprises rebalancing a processing load among computing devices of the entity.

In some implementations, changing an operation of a component of the entity comprises quarantining data associated with a component of the entity.

In some implementations, changing an operation of a component of the entity comprises quarantining data associated with a component of the entity.

In some implementations, the operations further include selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the operations further include receiving, for a key associated with the keyed data record, a set of additional data that is independent of a data record; generating an additional token representing the set of additional data; adding the additional token to the token sequence at a particular position among the tokens of the token sequence; and generating the one or more predicted next tokens based on the token sequence including the additional token.

In some implementations, the set of additional data comprises a set of sensor data, and wherein the set of sensor data is generated by a wearable device, and wherein additional tokens are added to the token sequence on a periodic basis.

In an aspect, a data processing process for generating a high-fidelity prediction for an addition of a coded data value to a data record includes obtaining a keyed data record including fields and values representing events; extracting, from the keyed data record, a set of fields and values associated with a subset of coded data values; generating a token sequence representing the set of fields in the keyed data record, a first token of the token sequence representing an event, and a second token representing a coded data value associated with the event of the first token, the first token and the second token being associated with each other in the sequence of tokens; generating one or more predicted next tokens of the token sequence by applying machine learning logic of a machine learning model to the token sequence, the machine learning model being trained using a tokenized set of data records each including a particular coded data value; determining whether the one or more predicted next tokens include the particular coded data value; and generating a classification output representing the prediction of the coded data value being added to the data record.

In some implementations, the prediction of the coded value being added to the data record represents a prediction of a presence or an absence of an anomaly in operation of a component of an entity associated with the data record, the anomaly corresponding to the coded data value.

In some implementations, when the anomaly is present in the operation of the component, the classification output is more than 99% likely to predict that the anomaly is present.

In some implementations, when the anomaly is not present in the operation of the component, the classification output is more than 50% likely to predict that the anomaly is not present.

In some implementations, the prediction of the coded value being added to the data record represents a prediction of a presence or an absence of a disease condition in a patient, the disease condition corresponding to the coded data value. In some implementations, the process includes mitigating or preventing the disease condition in the patient based on the prediction by causing intervention, such as causing further testing to be performed on the patient (including invasive testing), causing imaging of a particular region of the patient, generating a diagnosis and treatment plan for the patient based on the disease, and so forth. For example, the treatment plan can specify that cancer may be present in the patient and that surgery or chemotherapy should be initiated, the type of surgery or chemotherapy determination being based on the particular disease detected or predicted in the patient. In another example, a heart disease may be predicted, and a treatment plan of a stent, bypass surgery, or food and exercise regimen may be suggested. In another example, a stroke or aneurysm may be predicted, and imaging/surgery may be suggested in a corresponding location in the brain to prevent the stroke or aneurysm from occurring.

In some implementations, the particular coded data value comprises an error code. In some implementations, the particular coded data value represents a setting or configuration of a component of a computing system or control system.

In some implementations, the process includes selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the process includes receiving, for a key associated with the keyed data record, a set of additional data that is independent of a data record; generating an additional token representing the set of additional data; adding the additional token to the token sequence at a particular position among the tokens of the token sequence; and generating the one or more predicted next tokens based on the token sequence including the additional token.

In some implementations, the machine learning model comprises a transform decoder. In some implementations, generating the one or more next tokens comprises an autoregressive next-token prediction.

In an aspect, a process for pretraining a machine learning model with a set of scarcely labeled data, the process comprising: obtaining keyed data records, a data record including a set of fields and values representing events associated with a key value; extracting, from the keyed data records, a set of data records associated with a subset of coded data values, the subset of coded data values corresponding to a particular condition; generating, for each data record of the set, a token sequence representing one or more fields in that data record, a first token of the token sequence representing a first event, and a second token representing a coded data value associated with the first event of the first token, the first token and the second token being associated with each other in the sequence of tokens, the first and second tokens representing a first token set, and wherein the token sequence includes a second token set corresponding to a second event; training the machine learning model using the generated token sequences for each data record, wherein tokens of the second token set of a given generated token sequence are masked during the training using the tokens of the first token set of the given generated token sequence, the trained machine learning model configured to generate a predicted next token indicative of a presence or absence of an anomaly in an entity associated with the keyed data records.

In some implementations, the process includes applying the trained machine learning model to a set of keyed data records associated with a given entity when the keyed data records include the coded data value; and predicting the presence or the absence of the anomaly in the given entity.

In some implementations, the tokens of the second token set of the given generated token sequence being masked are associated with the anomaly, and wherein the machine learning model is trained to predict the anomaly using different instances of token sequences including the coded data value.

In some implementations, the entity comprises a computing system, and wherein the anomaly comprises a load balancing imbalance. In some implementations, the process includes causing mitigation of the anomaly by rebalancing a processing load among computing devices of the computing system.

In an aspect, a data processing system method for high fidelity prediction of a presence or absence of a disease condition in a patient, includes obtaining a data record representing medical data; extracting, from the data record, patient demographic information and medical treatment information, each instance of medical treatment information associated with a respective coded data value; generating a token sequence representing the patient demographic information and each instance of the medical treatment information, when tokens associated with an instance of the medical treatment are associated with the respective coded data value based on a position of the tokens in the token sequence; generating one or more predicted next tokens of the token sequence by applying transformer decoder model to the token sequence, transformer decoder model being trained using a tokenized set of data records each including a particular coded data value corresponding to a type of disease diagnosis; determining whether the one or more predicted next tokens include the particular coded data value; and generating a classification output representing the prediction of the presence or the absence of the disease condition in a patient, the disease condition corresponding to the coded data value.

In some implementations, when the patient has the disease condition, the classification output is more than 99% likely to predict that the disease condition is present. In some implementations, when the patient does not have the disease condition the classification output is more than 50% likely to predict that the disease condition is not present. In some implementations, the particular coded data value comprises an ICD code corresponding to at least one of pancreatic cancer, lung cancer, or liver cancer.

In some implementations, the process includes selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the process includes receiving, for a key associated with the keyed data record, a set of additional data that is independent of a data record. In some implementations, the process includes generating an additional token representing the set of additional data. In some implementations, the process includes adding the additional token to the token sequence at a particular position among the tokens of the token sequence. In some implementations, the process includes generating the one or more predicted next tokens based on the token sequence including the additional token.

In some implementations, the set of additional data comprises a set of sensor data. In some implementations, the set of sensor data is generated by a wearable device, and wherein additional tokens are added to the token sequence on a periodic basis. In some implementations, the particular coded data value comprises an ICD code corresponding to at least one of pancreatic cancer, lung cancer, or liver cancer. In some implementations, the particular coded data value comprises an ICD code corresponding to a heart condition. In some implementations, the machine learning model comprises a transform decoder. In some implementations, generating the one or more next tokens comprises an autoregressive next-token prediction.

The details of one or more embodiments of these systems and processes are set forth in the accompanying drawings and the description below. Other features, objects, and advantages of these systems and processes will be apparent from the description and drawings, and from the claims.

DETAILED DESCRIPTION

Figure 1:
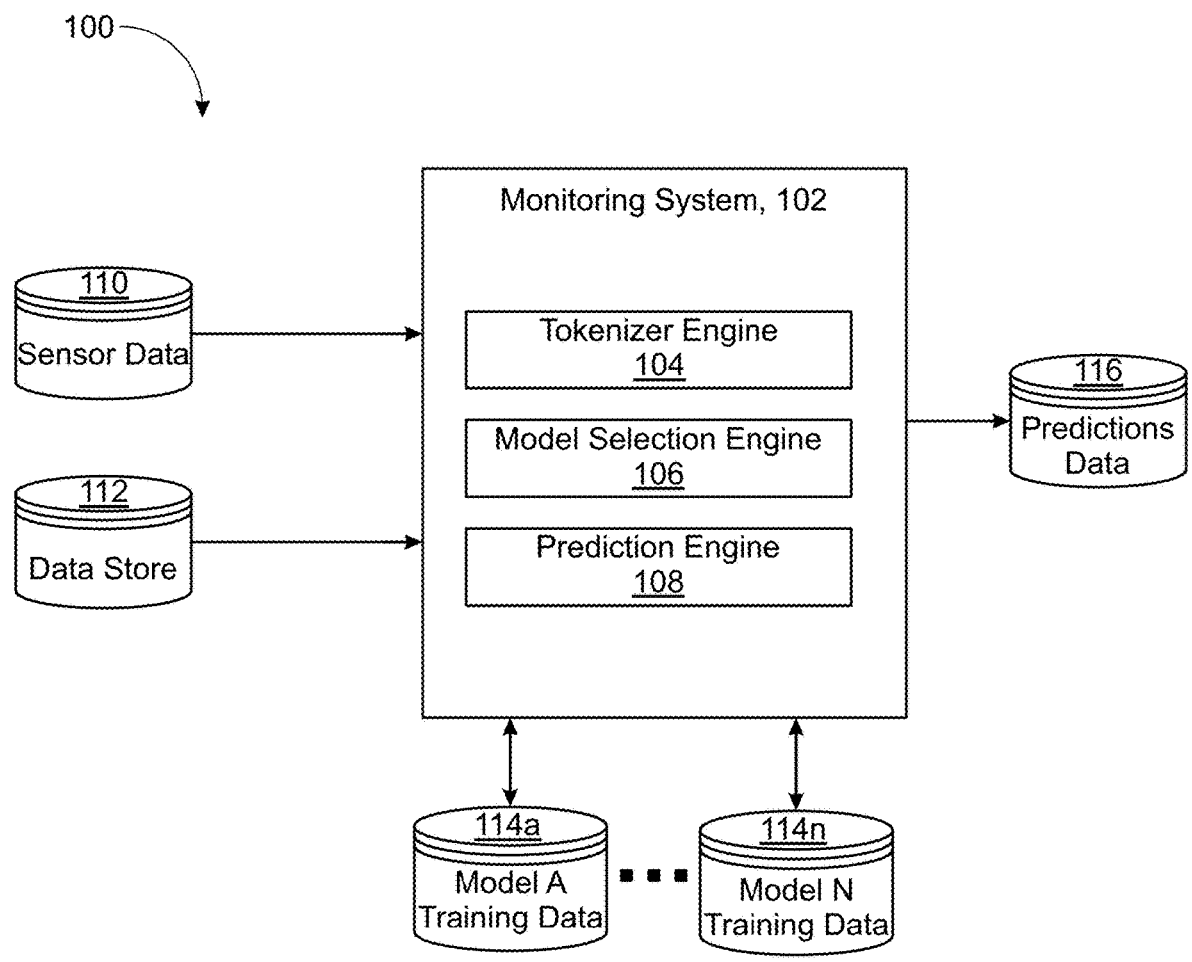
FIG. 1 illustrates an example of a data processing system.

FIG. 1 illustrates an example of a data processing system 100 for generating high-fidelity predictions of changes to coded data records. The data processing system 100 includes a monitoring system 102 that is configured to screen data records and predict whether coded data representing an anomaly will be added to the data records. In an aspect, the coded data represents the presence or occurrence of an error in a computing system, fault or defect in a system or device, a disease condition in a patient, and so forth.

When the coded data are added to a data record, the presence of the coded data indicates that the anomaly, fault, disease condition, etc. has been detected. However, in some cases, the coded data may be added to the data record after the anomaly represented by the coded data has been present or occurring for a long period of time (e.g., days, weeks, months, or years). The actual addition of the coded data to the data record may not be an accurate representation of when the fault or anomaly occurred. The data processing system can detect the latent presence of the anomaly based on values in the data record and can predict that the coded data representing the anomaly will be added to the data record at a later time (e.g., in response to detection of the anomaly). The data processing system can recommend further investigation to validate the prediction of the latent presence of the anomaly. For example, the data processing system can cause an alert to investigate a machine or device, cause load balancing in processing resources, quarantine data processing systems (e.g., to prevent the spread of malware), or perform some other mitigation action. In some implementations, the data processing system can recommend further screening in a patient for a disease condition, such as a cancer (e.g., lung pancreatic, or liver cancer), monitor a cardiac condition, and so forth.

In another example, the presence of patterns in a data record may typically result in an anomaly being detected at a later time, even if the anomaly has not occurred yet. The data processing system can determine that it is likely that such an anomaly will occur in the future and recommend steps to prevent or mitigate the effects of the anomaly before it happens. For example, data processing system can determine that a patient is likely to develop a cancer or have a heart attack based on patterns in her/his medical records. The data processing system can recommend a mitigation action, such as a medicine to prescribe, a laboratory test to perform, or other actions to mitigate the anomaly and/or prevent the anomaly from happening.

To generate the high-fidelity prediction for an addition of a coded data value to a data record, the monitoring system obtains data records including fields and values representing events that have occurred related to a subject of the data record. In some implementations, the data records are keyed data records, the key corresponding to the subject. The subject can include an entity such as a machine, device, person, system, or other entity being monitored for anomalies.

The monitoring system 102 generally includes at least one computing system that is configured to monitor data records, such as representing patient health or computing operations of a computer or computer network. The monitoring system 102 can monitor the operations of a computing system that generates a data stream describing operations of that computing system. In some implementations, the monitoring system 102 is invoked to screen data records. For example, the monitoring system 102 can be configured to monitor how a computing system responds to requests for data from one or more services of the computing system, how the computing system processes data, what errors occur during this processing, and so forth. Generally, the operations can include any function performed by the computing system. In another example, the monitoring system 102 monitors how patient data change over time as the patient visits a medical service provider and how the patient responds to treatment (or not) resulting from the visit.

In some implementations, a computing system includes the monitoring system 102. For example, the monitoring system 102 can include a software suite that is installed on the computing system. In some implementations, the monitoring system 102 is configured to monitor a plurality of entities, such as many patients, control systems, or computing systems including high-scale computing systems, data centers, cloud computing systems, and so forth. In such a configuration, the monitoring system 102 can identify the particular source of a data stream by a key value (e.g., host name, patient name, or other identifier). The monitoring system 102 receives the data stream from the entity, transforms the data stream into structured data, and generates a prediction of an anomaly.

Data records can be obtained from many different data sources, depending on the context. For example, data records can include log files, medical records, maintenance reports, and so forth. A data store 112 stores the data records. In some implementations, real-time sensor data 110, captured via sensors or provided by other sources, can be received by the monitoring system 102. The sensor data 110 can include directly measured data describing an entity. For example, sensors on a machine in a factory can indicate data such as temperature, motor rotations per minute, flow rates of fluid, or any such possible sensor measurement. For example, a patient can wear a device (a wearable computing system) that measures patient data such as heart rate, blood pressure, and so forth. In another embodiment, data are provided via messages provided by other data processing systems.

The monitoring system 102 is configured to scan (e.g., ingest character by character, value by value, etc.) data of the data records and generate tokens representing data entries of the data records as tokenized data elements. The monitoring system 102 is configured to extract, from a data record, a set of fields and values associated with a subset of coded data values. The coded data values correspond to a status of the entity of the data record. A coded value can correspond to an event such as a maintenance check (for a machine) or a check-up or physician visit (for a medical patient). The coded data value represents a present status of the entity, corresponding to one or more values representing how the entity is operating. For example, for a medical patient, the coded value may indicate that the patient had a routine check-up without any issues. Additional coded values may indicate the presence of symptoms or diagnosed disease conditions for the patient. For a machine, the coded values can indicate whether faults or errors were detected in the system, or whether operational values were outside an expected range. For example, the coded values may indicate one or more faults with components of the computing system or control system, such as faults with memory devices, data buses, network hardware, computing nodes, or other such devices. The coded values may indicate errors even in fault tolerant systems and/or distributed systems with redundant components. For example, the coded data values may indicate faults with devices in cloud computing systems.

The coded data values can be associated with operational values in event data. For example, an event can include data values measured from the entity and associate those values with the coded value. For a machine, the event data can include log data specifying processing load, CPU temperature, bandwidth consumption etc., maintenance data specifying machine parameters including sensor values for hardware on the system, etc. For a person, the event data can include blood parameters measured from a blood sample taken from a patient, blood pressure, heart rate, weight, pain index values, symptom information, and any other such data. In some implementations, these data are stored as natural language notes. In some implementations, these data are stored as signal or sound waves. In some implementations, these data are stored as captured images.

The monitoring system 102 is configured to generate a token sequence representing the set of fields in the keyed data record. The monitoring system 102 includes a tokenizer engine 104 configured to convert the values of data records to tokens, as subsequently described. In some implementations, a first token of the token sequence represents an event, and a second token of the token sequence represents a coded data value associated with the event of the first token. The first token and the second token are associated with each other in the sequence of tokens. As subsequently described, the tokenizer engine 104 orders the tokens based on the order of the events in the data record. The sequence of tokens is specific to the order of the events such that the order is consistently applied across all records.

A token includes a unit of the data stream which is a building block of the data stream as determined by the monitoring system 102. A token is associated with metadata indicative of a type of the token and/or a value of the token, when applicable. A token generally represents a value in the data record. Tokens of the data record can be different from one another. Tokens of an event of the data record (e.g., a log message, patient visit, etc.) can be associated with one another (e.g., grouped together). Generally, the content of tokens of a data record is based on what the data record includes. The extraction logic can be predefined, determined dynamically based on the records of data being received, or a combination of the two.

Metadata are associated with each token and include a description of the data represented by the token. In another example, the metadata associated include information related to the capturing or providing sensor or system that provided the data. The metadata indicate a type of the token, which can be relevant to the particular data record being transformed by the monitoring system 102. For example, the metadata indicating the type of a token can indicate that the token represents a time stamp (e.g., date), a patient demographic, a system name (e.g., particular computing system that responded to a request for data by a client device), an event name (e.g., a routine check-up, hospital visit, etc.), and so forth.

The values of the metadata of a token are referred to as the attributes of the token. The attributes of the token can include a token type and a token value. For example, some tokens can represent keys of the data record, while other tokens can represent values of the keys. For example, metadata can indicate that a token type is a time stamp, while the value can include the value of the time stamp. Not every token includes a value. In some implementations, the value of a token is not considered useful by the monitoring system 102 for screening for a disease condition. In this case, the value of the data included in the token can be discarded. For example, it might be relevant that the data record includes a time stamp, which may indicate that an event has occurred. However, the actual time represented in the time stamp may not be necessary for screening. The monitoring system 102 tokenizes the portion of the data sequence including the time stamp as a token, without regard to the value of the data in the time stamp. Alternatively, or in addition, a token can include syntax of the data stream, and the metadata can indicate that a token includes the syntax. In some implementations the metadata include data indicating an operative function of the syntax included in the token.

The monitoring system 102 is configured to transform the data records into sequences of tokens. This transformation can be referred to as tokenization of the data record in this disclosure. The tokens that are generated for each data record represent the structure of the content of the data record.

The monitoring system 102 is configured to encode the content of each data record in a list of tokens so that a future data record structure can be predicted from the tokens, as subsequently described. Generally, the token order is determined based on the order of the values in the data record. In other words, the order of the tokens representing the data record correspond to the order of the values and fields of events in the data record to preserve the structure of the content of the data record.

The monitoring system 102 ingests the data records as follows. In some implementations, the monitoring system 102 can ingest the data record one character or value at a time. In some implementations the monitoring system 102 can ingest the data record in batches of values or fields. The monitoring system 102 applies a deterministic finite automaton to the received data stream to generate the tokens. The automaton includes a set of parsing rules for tokenizing the data records into tokens. For example, when a value is received, the monitoring system 102 can determine whether a particular token should be generated based on the preceding values that were received. The automaton can include a lookup table, a directed graph, a state machine, etc. Computation cost of applying the set of parsing rules is independent of the number of parsing rules included. The parsing rules can be evaluated against the data record by using a finite automaton. The parsing rules are consistently applied to the data stream so that discovered patterns are deterministic. The tokens that are generated by the monitoring system 102 can be stored by the monitoring system 102 in a storage as tokens data.

The monitoring system 102 is configured to select a model to apply to the token sequence based on the anomaly being detected. For example, for screening for a particular disease condition, the data processing system 100 selects a machine learning model with training data 114a-n trained only on data records in which the disease condition is represented. The machine learning models can be pre-trained on hundreds, thousands, or more examples of data records including the disease condition being predicted. The model selection engine 106 detects the disease condition (or other anomaly condition) being screened and accesses the corresponding machine learning model.

The monitoring system 102 is configured to generate one or more predicted next tokens of the token sequence by applying machine learning logic of a machine learning model to the token sequence. The machine learning model is trained using a tokenized set of data records each including a particular coded data value, as previously described.

Example machine learning models are now described. In an example, a decoder-only transformer is used to process the tokenized data records. In some examples, any other transformer configurations known in the art can be used. In some implementations, the tokenized data records include longitudinal (full-length) electronic health records data. A record of each patient includes their demographic information, including age and gender, along with a sequence of n chronologically ordered visits. Each visit includes a set of m medical events covering diagnoses, medications, procedures, and other clinical events. Together, each patient's token sequence is represented as:

$$[c_{age}, c_{gender}, v_1, t_1, v_2, \ldots v_{n-1}, t_{n-1}, v_n[\text{EOS}]], \quad (1)$$

$$v_n = [c_n^1, c_n^2, \ldots, c_n^m]. \quad (2)$$

where $c_{age}$ is a token representing a patient age, where $c_{gender}$ is a token representing a patient gender, $v_1$ is a token representing a patient visit (including events tokens $c_n^1$ to $c_n^m$ representing coded data values), where $t_1$ is a token representing a time, and where EOS is a token representing the end of the token sequence. In a computing system context, the tokens can indicate components such as types of hardware (e.g., corresponding to a product number or other identifying information), a version of software, types of versions of sensors, memory devices, network devices, computing devices, or any other identifying information. For example, for a control system (e.g., in a refinery) a token may indicate that the component or device being monitored is a valve made by a particular manufacturer in a particular year or on a particular date. An index can be associated with every instance of the valve in the refining process. The system may predict when a valve needs to be replaced based on operational data related to the valve. For example, the value may not close or open as quickly as it should, based on measurements of flow rates in a pipe associated with the valve. In this case, the valve may be close to failing. While a valve is described as an example component or device, these components can include any portion of an entity that can be associated with operational data such that a control system (or other monitoring system) can change the operation of the component or cause a change in the operation of the component to mitigate or prevent the anomaly. In another example, the monitoring system can cause a change to a treatment or use of a component to mitigate or prevent the anomaly, such as preventing a valve from leaking in a pipe or a disease from occurring in a patient.

In this example, the sequence begins with demographic tokens, $c_{age}$ and $c_{gender}$. Age can be discretized into predefined categorical ranges, and gender is assigned as a distinct token. Each medical event code $c_n$ can be assigned a unique token, providing a compact ID-based representation for the unique medical event. Time intervals between consecutive visits are captured using time tokens t, which are also discretized into predefined categories to encode temporal information. As stated previously, a special token, [EOS] marks the end of the patient's record.

The patient's token sequence is fed into a foundation model including a decoder-only transformer. In an example, the monitoring system 102 uses rotary positional embeddings (RoPE) to encode positional information for events related to an entity. The events can include, such as, medical visits by a patient. The events can include diagnostic checkups for computing hardware. The events can indicate when changes to hardware configurations of a computing system are made, such as the addition or replacement of computing hardware. The events can include receipt of wearable data from a sensor on a patient. The events can include software upgrades or changes to operational procedures for a computing system. The positional information is encoded as:

$$\text{RoPE}(x_i, p_i) = x_i \cdot \cos(\theta(p_i)) + x_{i_\perp} \cdot \sin(\theta(p_i)) \quad (3)$$

where event code tokens from the same visit share the same absolute position (replacing sequential positions like 0,1,2,3 ... with 0,0,1,1 ... ), allowing the model to capture the relationships between events within and across visits).

The monitoring system 102 includes a prediction engine configured to determine whether the one or more predicted next tokens include the particular coded data value representing the disease condition, computing anomaly, or another anomaly, such as a failing memory device, errors in transmitted data, hardware faults in a controlled system, a presence of cancer in a patient, and/or presence of symptoms or conditions that may result in a stroke in a patient. The predicted next tokens correspond to a predicted next event that is to occur for the entity, such as a computing system or patient. The predicted next token may include a coded value indicative of the anomaly (fault or disease condition, etc.), and thus allow immediate mitigation/prevention of the anomaly.

The machine learning models are pretrained from scratch on a pretraining dataset using an autoregressive next-token prediction objective.

$$\min_{\theta} \mathcal{L}_{LM}, \mathcal{L}_{LM} = -\frac{1}{n} \sum_{j=1}^{n} \log p_\theta(x_j | x_{<j}), \quad (4)$$

$$p_\theta(x_j | x_{<j}) = \text{Softmax}(Eh_j). \quad (5)$$

The next code probability $p_\theta(\cdot)$ is parameterized by token embeddings E and hidden states h from $G_\theta$. Pretraining on large scale patient record with autoregressive language modeling task enables the machine learning model to capture complex medical patterns in patient health trajectories. Similarly, pretraining on large scale log data from a computing system with a specific hardware or software configuration (or both) with the autoregressive language modeling task enables the machine learning model to capture complex data processing patterns in computing system logs or other operational data, as described previously.

After pretraining, a supervised fine-tuning is performed to predict whether a patient will have the disease condition or computing anomaly being screened. The model is trained via cross-entropy loss.

$$\min_{\theta, \phi} \mathcal{L}_{SFT}, \mathcal{L}_{SFT} = -\log p_\phi(y | x_{[EOS]}), \quad (6)$$

$$p_\phi(y | x_{[EOS]}) = \text{Softmax}(W h_{[EOS]} + b), \quad (7)$$

The learnable parameters include θ in the foundation model, and W and b from a linear prediction layer. Fine-tuning enables the machine learning model to screen for an anomaly (e.g., a disease condition such as a target cancer, cardiovascular anomalies, or stroke) by capturing critical cancer, cardiovascular anomalies, or stroke risk factors from patients' medical histories. Similarly, the fine-tuning enables the machine learning model to screen for data processing anomalies such as errors the data processing output, errors in operational or diagnostic data, or other anomalies that are detected in a computing system or control system's operational data.

The inference of the machine learning model is to run standard forward pass of the finetuned model checkpoints to predict disease conditions, control system or computational faults, or other anomalies. The machine learning model uses a patient's past medical history without requiring further data and is widely performable. The only cost is the model inference, which can be done efficiently even on CPU (rather than GPU) machines.

The monitoring system 102, with prediction engine 108, generates a classification output representing the prediction of the coded data value being added to the data record. In practice, the machine learning model can serve as a first defense against an anomaly such as a disease condition, performing screening on periodically with near zero cost. Computing systems or patients that are flagged by the screening can undergo advanced evaluation and further screening, such as using medical imaging. The holistic screening procedure provides operators (or medical service providers) a broader window for effective response to anomaly conditions and improved outcomes, as previously described.

Figure 2A:
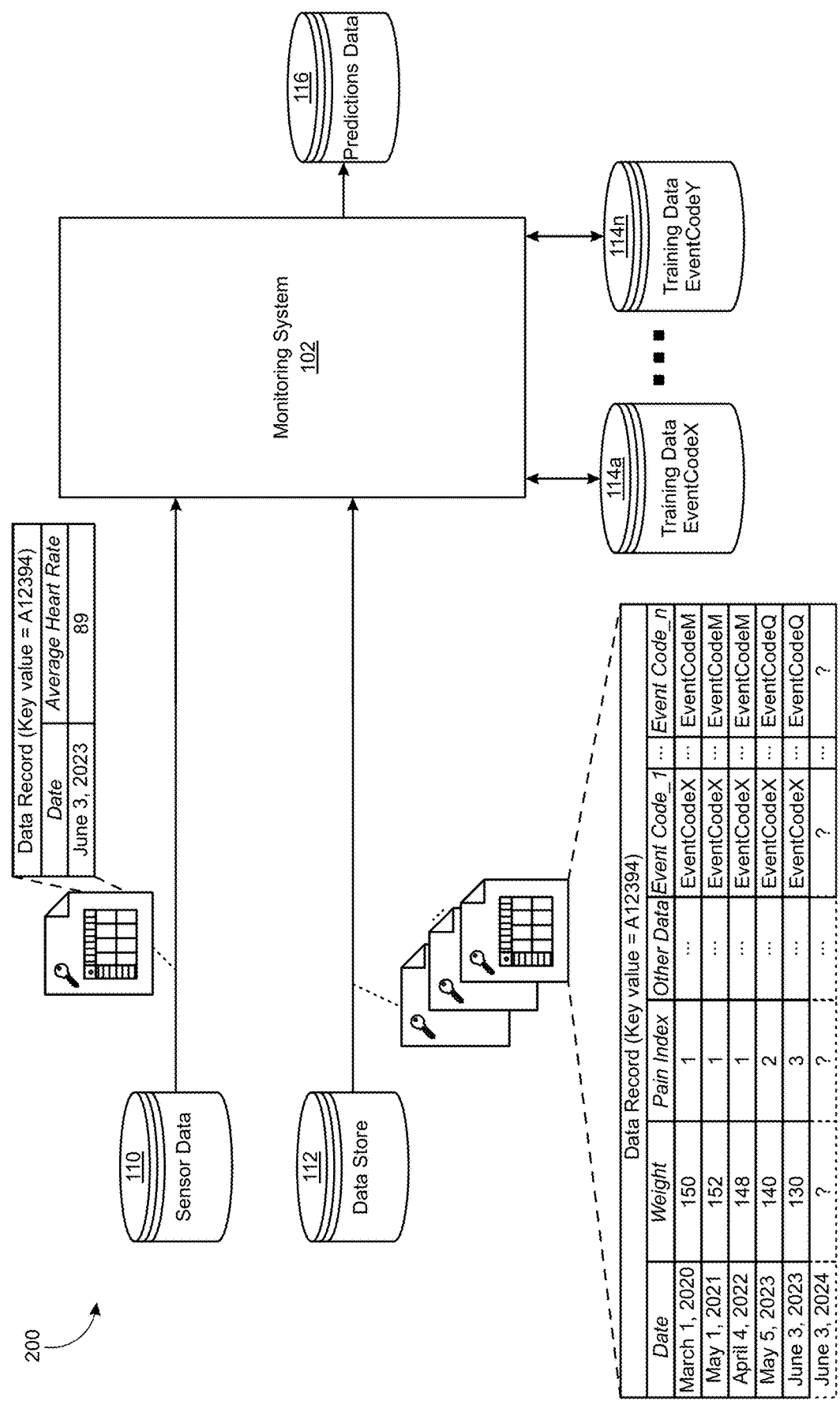
FIGS. 2A-2C illustrate an example of a data processing system predicting anomalies in data records.
Figure 2B:
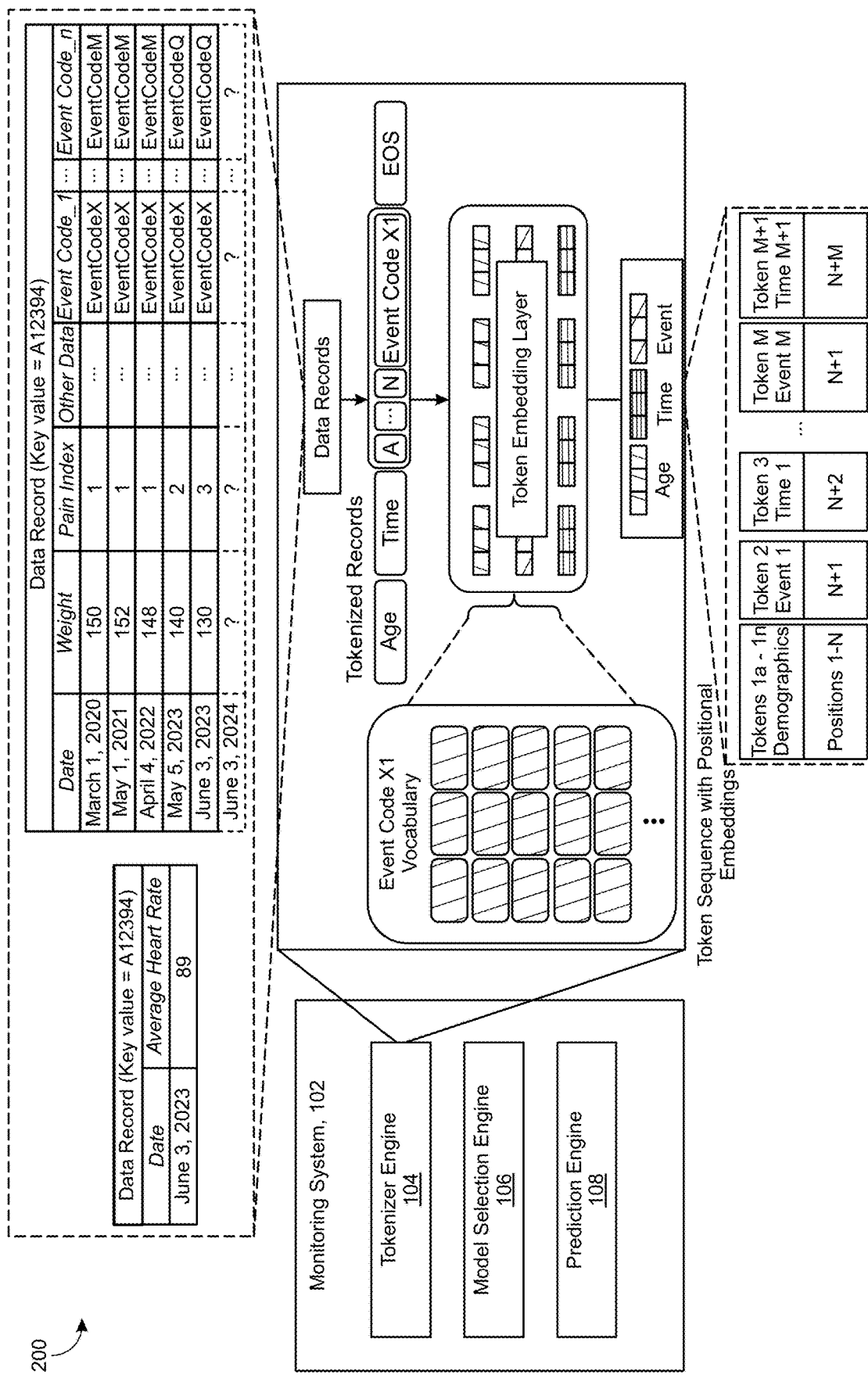
Figure 2C:
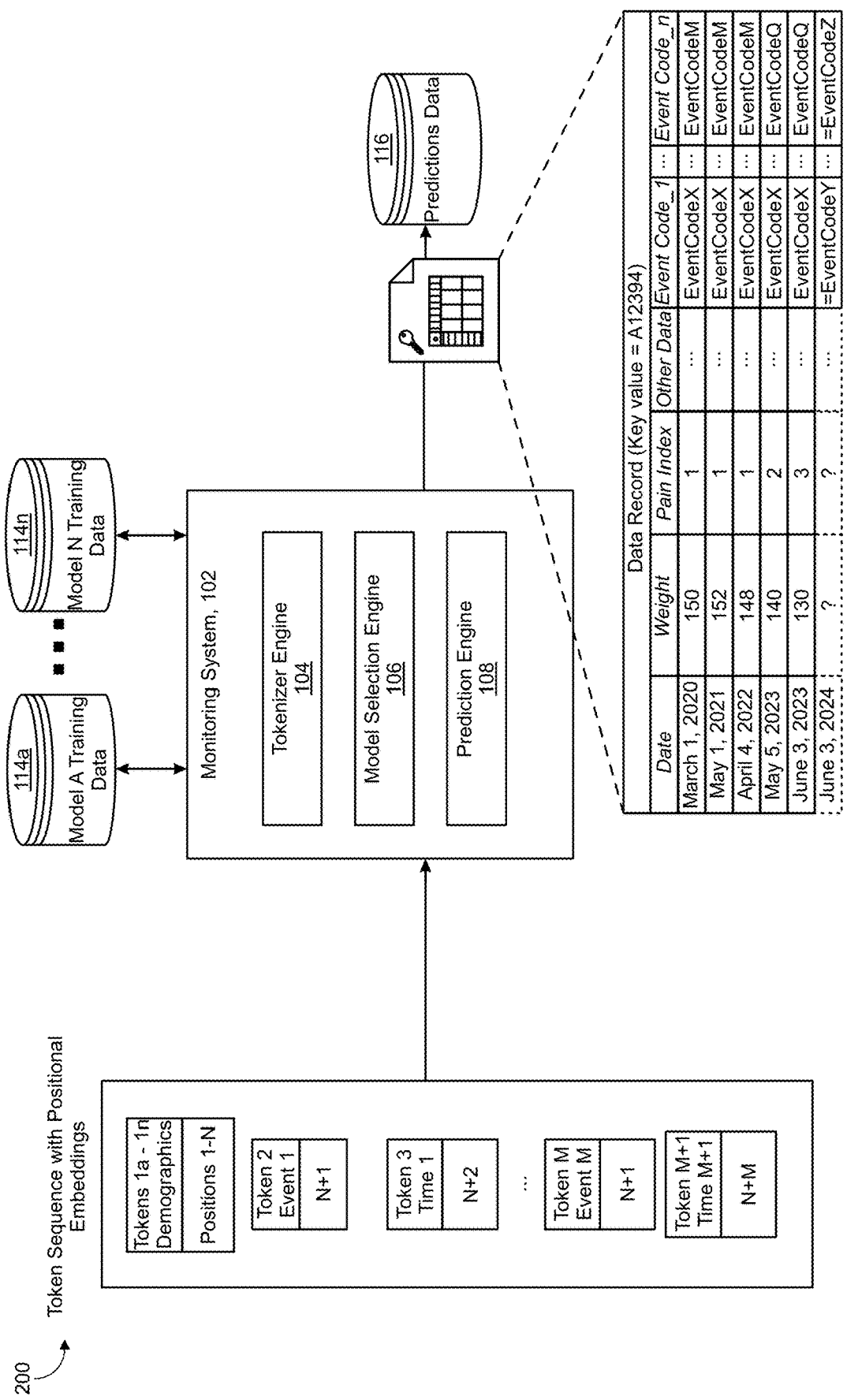

FIGS. 2A-2C illustrate an example process 200 of a data processing system predicting anomalies in data records. FIG. 2A shows the monitoring system 102 receiving data records for an entity associated with key value A12394. As previously described, the monitoring system 102 is configured to receive data records having a key value. The monitoring system can associate different records with a same entity based on the key value. The monitoring system 102 is configured to predict a presence or absence of an anomaly by predicting whether a coded data value (e.g., event code) will be present in a next data value in the data record. In some implementations, the prediction is a binary classification for each anomaly being screened in the data record.

FIG. 2B shows a tokenization of the data record, as previously described. The data record is tokenized into a token sequence. In this example, data records can be combined if the machine learning model was trained on these combined data records to generate token sequences. In some implementations, a separate token sequence is generated for each data record.

The tokenizer 104 engine generates a token sequence in which the tokens conform to a predefined structure, as previously described. The token sequence is input into the prediction engine 108, which executes a corresponding pretrained model for a given anomaly being screened as selected by the model selection engine 106.

FIG. 2C shows an example output that is based on the prediction of the machine learning model. Specifically, the model outputs a binary classification of whether a token representing the anomaly is predicted to occur in the token sequence or not. The monitoring system can identify an event code (or other value) associated with the predicted anomaly token and generate prediction data 116. The prediction data 116 can be used to generate an alert. In some implementations, the monitoring system can specify a specific action to perform responsive to the predicted event code.

For example, the monitoring system 102 can recommend an additional screening test, data measurement, or other action to validate the prediction and/or mitigate the anomaly, as described previously.

The machine learning model's pretraining scaling, screening performances, design choices, and robustness to different data distributions are now described. In addition, an interpretability analysis is performed to describe cancer risk signals captured by the machine learning model.

Figure 3:
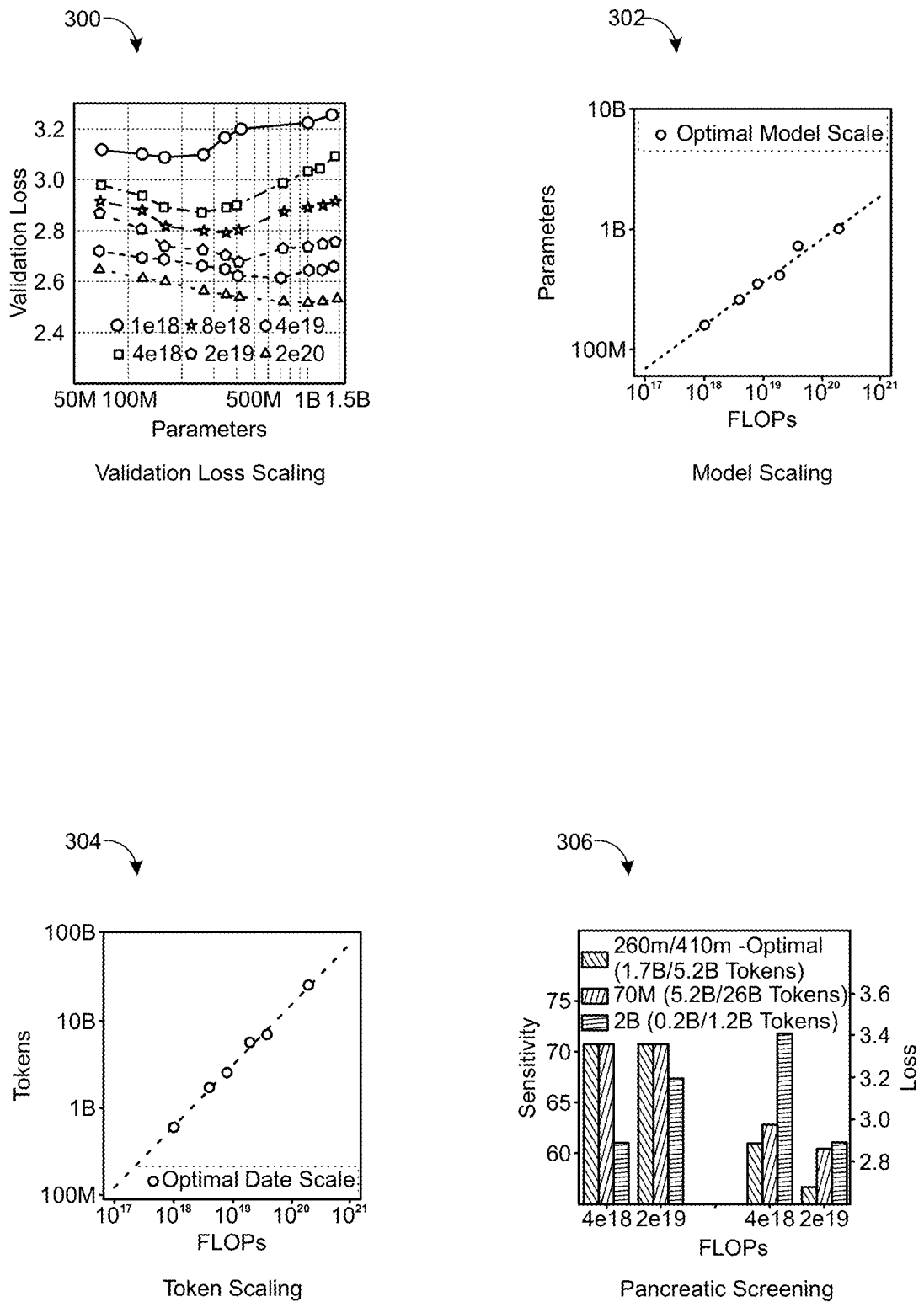
FIG. 3 illustrates example graphs representing a performance of a machine learning model.

To pretrain effectively on healthcare record or other operational data, a scaling law analysis is performed for the machine learning model. FIG. 3 illustrates example graphs 300, 302, 304, and 306 representing the scaling law analysis of the machine learning model. Graph 300 illustrates clear parabola shaped IsoFLOP curves, with different model sizes achieving minimum validation loss at various FLOPs, almost identical trends with large language model pretraining. Using these data points, a power law is fitted to characterize the relationship between FLOPs (C), the loss-optimal model size (Nopt), and the optimal number of training tokens (Dopt), as illustrated in graphs 302 and 304. More specifically, the scaling law can be expressed as $$\text{Optimal Model Sizes: } N_{opt} \propto C^{0.34}, \quad (8)$$

$$\text{Optimal Token Counts: } D_{opt} \propto C^{0.69}, \quad (9)$$

which resembles the scaling laws of pretraining language models on texts. The compute-optimal pretraining configurations at different FLOPs also lead to best downstream benchmarks, as illustrated in graph 306. Specifically, graph 306 represents at task performance of compute optimal/non-optimal pretraining.

A cancer screening performance of the machine learning model is shown in Table 1. Cancer screening is challenging with less than 4% positive cases in the highly-skewed case-control test set. Clinicians can generally indicate that 99%+ specificity is necessary for trust, as lower specificity leads to too many unreliable false alarms. Among all baselines, only the machine learning models described herein satisfy this 99%+ threshold while achieving 60%+ sensitivity on three cancer types. Sensitivity is also increased with the pretraining scale, from 70.7% (160M parameters) to 73.5% (model 1(b)), identifying 883 vs. 849 of 1201 cancer patients after one year.

TABLE 1

Performance Results

| Model | FLOPs | F1 | AUROC | AUPRC | Specificity | Sensitivity | 1-year | 3-year | 5-year | Terminal |
|---|---|---|---|---|---|---|---|---|---|---|
| Cancer: Pancreatic, Positive/Negative (Ratio): 1201/30382 (3.95%) | | | | | | | 39.2 | 27.3 | 20.3 | 0 |
| XGBoost | — | 79.0 | 95.7 | 68.8 | 99.6 | 46.6 | 59.7 | 29.3 | 22.0 | 33.8 |
| LightGBM | — | 81.3 | 96.2 | 72.9 | 99.6 | 51.3 | 61.8 | 29.5 | 22.1 | 37.2 |
| RETAIN | — | 48.5 | 78.3 | 11.6 | 80.7 | 46 | 59.4 | 29.3 | 21.9 | 33.3 |
| StageNet | — | 49.0 | 79.4 | 11.8 | 100.0 | 0.0 | 39.2 | 27.3 | 20.3 | 0.0 |
| BioGPT-347m | — | 74.7 | 94.0 | 55.0 | 98.8 | 44.1 | 58.6 | 29.2 | 21.9 | 31.9 |
| Qwen2.5-500m | — | 82.1 | 96.1 | 73.7 | 98.9 | 62.4 | 66.6 | 29.9 | 22.5 | 45.2 |
| CATCH-FM-160m | 1e18 | 86.6 | 97.1 | 81.2 | 99.2 | 70.7 | 70.3 | 30.3 | 22.8 | 51.2 |
| CATCH-FM-410m | 2e19 | 87.3 | 96.4 | 81.2 | 99.3 | 70.8 | 70.4 | 30.3 | 22.8 | 51.3 |
| CATCH-FM-720m | 4e19 | 87.7 | 96.7 | 82.0 | 99.2 | 73.1 | 71.4 | 30.4 | 22.9 | 52.9 |
| CATCH-FM-1b | 2e20 | 87.4 | 97.0 | 82.7 | 99.2 | 73.5 | 71.5 | 30.4 | 22.9 | 53.2 |
| Cancer: Liver, Positive/Negative (Ratio): 1099/28353 (3.88%) | | | | | | | 50.5 | 37.9 | 27.9 | 0.0 |
| XGBoost | — | 79.4 | 95.6 | 69.2 | 99.6 | 47.1 | 64.2 | 40.6 | 30.1 | 27.7 |
| LightGBM | — | 81.8 | 96.1 | 73.1 | 99.6 | 52.3 | 65.6 | 40.9 | 30.3 | 30.8 |
| RETAIN | — | 51.2 | 54.7 | 8.8 | 85.4 | 44.3 | 63.4 | 40.5 | 29.9 | 26 |
| StageNet | — | 49.1 | 72.7 | 9.0 | 100.00 | 0.0 | 50.5 | 27.9 | 0.0 | 0.0 |
| BioGPT-347m | — | 73.8 | 93.4 | 55.4 | 99.3 | 38.4 | 61.7 | 40.1 | 29.7 | 22.6 |
| Qwen2.5-500m | — | 81.5 | 94.8 | 70.0 | 99.4 | 55 | 66.5 | 41.1 | 30.5 | 32.3 |
| CATCH-FM-160m | 1e18 | 84.5 | 96.0 | 76.6 | 99.3 | 63.4 | 68.9 | 41.5 | 30.8 | 37.3 |
| CATCH-FM-410m | 2e19 | 85.6 | 96.5 | 78.5 | 99.5 | 63.6 | 69.0 | 41.6 | 30.8 | 37.4 |
| CATCH-FM-720m | 4e19 | 85.1 | 95.5 | 76.5 | 99.3 | 66.1 | 69.8 | 41.7 | 30.9 | 38.9 |
| CATCH-FM-1b | 2e20 | 85 | 95.1 | 77.0 | 99.1 | 68.7 | 70.5 | 41.8 | 31.1 | 40.4 |
| Cancer: Lung, Positive/Negative (Ratio): 868/30153 (2.88%) | | | | | | | 53.7 | 39.3 | 28.8 | 0.0 |
| XGBoost | — | 77.4 | 95.4 | 64.5 | 99.7 | 42.3 | 67 | 41.5 | 30.9 | 28.8 |
| LightGBM | — | 79.5 | 95.2 | 68.9 | 99.7 | 47.0 | 68.5 | 42.0 | 31.2 | 32.0 |
| RETAIN | — | 49.3 | 19.8 | 2.1 | 100.0 | 0.0 | 53.7 | 39.3 | 28.8 | 0.0 |
| StageNet | — | 49.3 | 71.6 | 6.2 | 100.0 | 0.0 | 53.7 | 39.3 | 28.8 | 0.0 |
| BioGPT-347m | — | 76.2 | 95.0 | 58.5 | 99.4 | 44.5 | 67.7 | 41.7 | 31.3 | 30.3 |

TABLE 1-continued

Performance Results

| Model | FLOPs | F1 | AUROC | AUPRC | Specificity | Sensitivity | 1-year | 3-year | 5-year | Terminal |
|---|---|---|---|---|---|---|---|---|---|---|
| Qwen2.5-500m | — | 79.8 | 95.8 | 69.9 | 99.5 | 51.7 | 69.9 | 42.0 | 31.4 | 35.2 |
| CATCH-FM-160m | 1e18 | 82.1 | 95.8 | 71.5 | 99.6 | 54.7 | 70.9 | 42.2 | 31.5 | 37.2 |
| CATCH-FM-410m | 2e19 | 82.7 | 96.2 | 73.6 | 99.7 | 55.3 | 71.1 | 42.3 | 31.5 | 37.6 |
| CATCH-FM-720m | 4e19 | 82.3 | 94.9 | 69.1 | 99.2 | 61.9 | 73.2 | 42.6 | 31.9 | 42.1 |
| CATCH-FM-1b | 2e20 | 82.1 | 94.0 | 69.6 | 99.2 | 62.0 | 73.2 | 42.6 | 31.9 | 42.2 |

Effective cancer screening improves life expectancy in survival rate estimation. The machine learning models described herein can raise the one-year survival rate of all three cancers to over 70% with standard treatments. Without effective screening, the deadly pancreatic cancer killed over 60% of patients in the database within a year. Early detection as described herein can save over 40% of terminal-stage patients to survive the first year. Cancer patients survived after five years are often considered cancer survivors. The machine learning models described herein would improve five-year survival rate of all three cancers, but only by 3%, despite that a majority of patients are flagged out.

Table 2 evaluates the performance of various variants the machine learning model. The results restate the recent belief in foundation and large language models that what data to pretrain upon is more crucial than architecture twists. Changing the positional embedding of time token embeddings does not matter much, while pretraining on healthcare record boosts the sensitivity from 55.7% to 70.7%. Training on the medical code representations significantly outperforms using mapping ICD codes into their text descriptions and then leverage pretrained language models. The latter causes ambiguity and reduces the information conveyed per pretraining tokens. The pretraining data described herein is sufficient to pretrain compute-optimal healthcare foundation models in the billions parameter range.

TABLE 2

Ablation study on various pretraining strategies and model architecture on cancer pancreatic task

| Variations | F1 | AUROC | AUPRC | Specificity | Sensitivity |
|---|---|---|---|---|---|
| Medical Code Representation | | | | | |
| CATCH-FM-160m | 86.6 | 97.1 | 81.2 | 99.2 | 70.7 |
| No Pretrain | 81.4 | 95.9 | 71.2 | 99.3 | 55.7 |
| Model Architecture | | | | | |
| w. TokenLevelRel-Pos | 86.3 | 97:2 | 81.1 | 99.2 | 70.4 |
| w/o. time token | 86.6 | 96.5 | 80 | 99.2 | 70.3 |
| Converted Text Representation | | | | | |
| No Pretrain | 69.6 | 91.8 | 39.9 | 96.5 | 49.6 |
| Finetune Pythia | 76 | 94.2 | 59.4 | 98.7 | 51.8 |
| Pretrain from Scratch | 78.4 | 95.1 | 64.8 | 98.9 | 52.6 |

A robustness of the machine learning model is now described. A positive group in cancer screening includes two types of patients: first cancer diagnoses, those who have not had cancer before, and reoccur cancers, those who have other cancer types. Table 3 lists the performance of the machine learning model on each group.

TABLE 5

Performance of the machine learning model on positive patients first diagnosed with the target cancer and those with reoccurred cancer.

| Category | Pos./Neg. | F1 | AUROC | AUPRC | Specificity | Sensitivity |
|---|---|---|---|---|---|---|
| Cancer: Pancreatic | | | | | | |
| First | 559/30382 | 77.3 | 94.9 | 60.3 | 99.2 | 55.4 |
| Reoccur | 642/30382 | 88.9 | 98.9 | 91.4 | 99.2 | 89.3 |
| Cancer: Liver | | | | | | |
| First | 528/28353 | 74.8 | 91.8 | 50 | 99.1 | 50.6 |
| Reoccur | 571/28353 | 86.5 | 98.2 | 86.9 | 99.1 | 85.1 |
| Cancer: Lung | | | | | | |
| First | 419/30153 | 71.2 | 88.1 | 40.7 | 99.2 | 41.1 |
| Reoccur | 449/30153 | 84.9 | 97.2 | 80.5 | 99.2 | 79 |

More than half of target cancer patients have had other cancer before, showing the persistent nature of cancer. The machine learning model has a much higher sensitivity on this reoccur group. These patients' medical histories have strong indicators that these patients are high risk. The machine learning model effectively flags them, with 80% sensitivity, providing clinicians a better chance to handle potential metastasis, which is extremely deadly. The first-diagnosed group is much harder to capture, yet the machine learning model is able to flag a significant portion of them. The specificity remains at 99% in both groups, ensuring the usability of the machine learning model.

The machine learning model is evaluated on different negative cohorts. The case-controlled cohorts mimic the cancer screening in corresponding medical departments, while deploying cancer screening in the general population would introduce controls randomly sampled from within the general population, with a much lower cancer rate, e.g., 1%.

Figure 4:
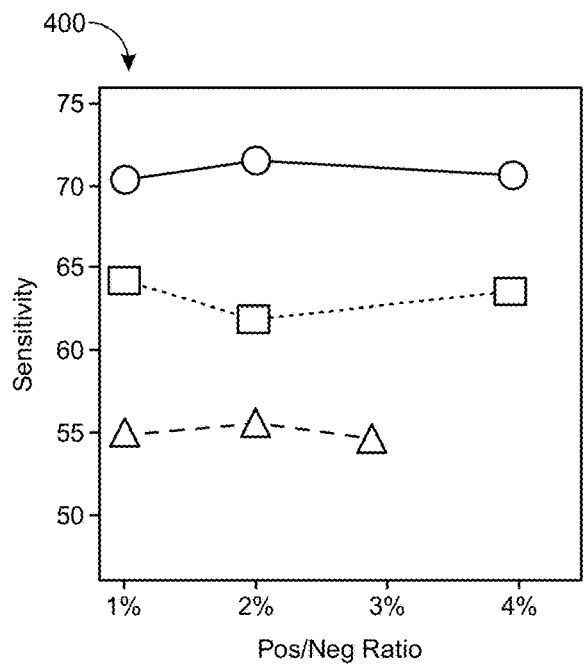
FIG. 4 illustrates example graphs representing a performance of a machine learning model.
Figure 4:
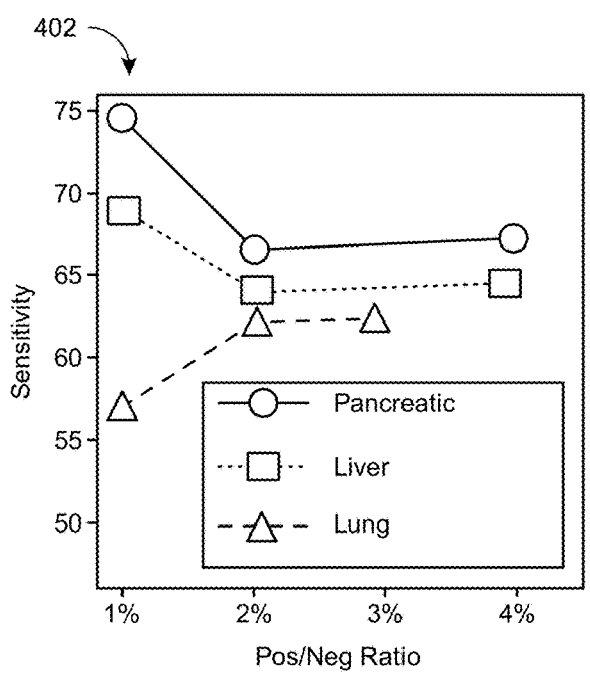

FIG. 4 illustrates example graphs 400, 402 representing a performance of a machine learning model. Graphs 400, 402 plot the performance of the machine learning model on these two control groups with varying positive ratio in the testing set. The machine learning model is robust to different population distributions and maintains high sensitivity and specificity with as low as 1% positive rate. Table 6 further studies the machine learning model performance when trained and tested on different distributions.

finetuning and crossed 50% with only 20,000 total patient data across two decades, which is fewer than a typical hospital.

LLM interpretation methods are used to understand the signals captured by the machine learning model. Specifically, a sparse autoencoder is trained on the prediction layers of a fine-tuned machine learning model described herein, and a neuron-to-graph (N2G) method is used to explain the top activated latent features on positive cancer cases. Some top features are described in Table 7.

TABLE 7

Top latent features on cancer patients learned by sparse autoencoder on the machine learning model prediction layer.

| | Description Generated by Node2Graph |
|---|---|
| Cancer | |
| Pancreatic | Type 2 diabetes mellitus, Hypertensive heart disease, Norvasc tablet, Hypothyroidism and thyroid |
| | High blood pressure, Diseases of the respiratory system, other operations on larynx or trachea, Telmisartan |
| | Infectious and parasitic diseases, Intestinal infectious diseases, Pramipexole, Piracetam |
| | Duodenal ulcer, Tetracyclines, Ursodeoxycholic acid, Famotidine |
| Liver | Repair of uterus and supporting structures, Diagnostic procedures on lymphatic structures, Ancillin, Ketoprofen |
| | Diclofenac, Anxiety state, Dysthymic disorder, Gastrojejunal ulcer |
| | Loperamide, Chest view, Chronic ischemic heart disease, Diovan, Full blood test, Lymphatic diagnostic procedures |
| Lung | Hypertensive heart disease with congestive heart failure, Isosorbide mononitrate, Inguinal Hernia Repair |
| | Adenocarcinoma, Esophagomyotomy, Norvasc tablet , Bilateral inguinal hernia repair, Isosorbide mononitrate |

TABLE 6

Evaluation of pretrained compute-optimal model for cancer screening with different target controls on negative cases.

| Negative Selection | | F1 | | | Speci- | Sen- |
|---|---|---|---|---|---|---|
| Training | Testing | (Macro) | AUROC | AUPRC | ficity | sitivity |
| Cancer: Pancreatic | | | | | | |
| Controlled | Controlled | 86.6 | 97.1 | 81.2 | 99.2 | 70.7 |
| Random | Random | 86.3 | 95.9 | 78.5 | 99.4 | 67.2 |
| Controlled | Random | 85.5 | 96.9 | 79.7 | 99 | 70.7 |
| Random | Controlled | 87.8 | 95.6 | 80.1 | 99.6 | 67.2 |
| Cancer: Liver | | | | | | |
| Controlled | Controlled | 84.5 | 96 | 76.6 | 99.3 | 63.4 |
| Random | Random | 85 | 95 | 75.8 | 99.3 | 64.5 |
| Controlled | Random | 79.4 | 94.6 | 69 | 98.2 | 63.4 |
| Random | Controlled | 85.2 | 94.6 | 75.5 | 99.4 | 64.5 |
| Cancer: Lung | | | | | | |
| Controlled | Controlled | 82.1 | 95.8 | 71.5 | 99.6 | 54.7 |
| Random | Random | 83.5 | 96.1 | 72.5 | 99.4 | 62.4 |
| Controlled | Random | 83.4 | 95.9 | 72.8 | 99.8 | 54.7 |
| Random | Controlled | 84 | 95.6 | 72.7 | 99.4 | 62.4 |

Figure 5:
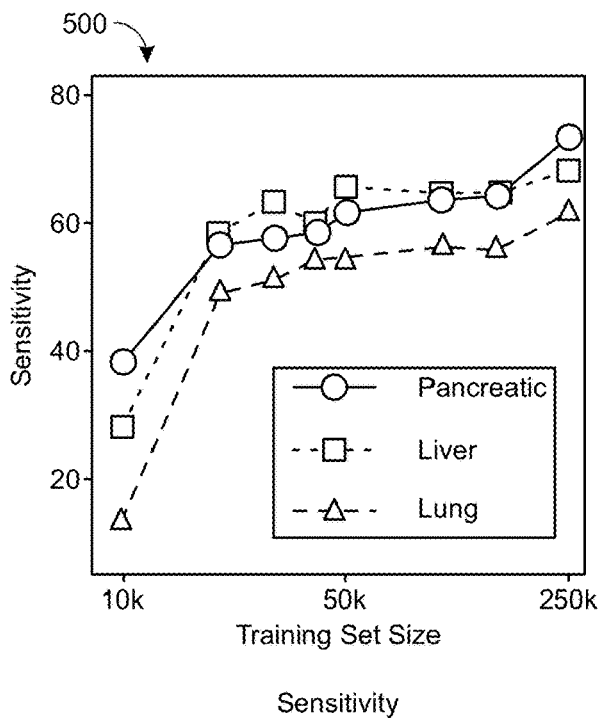
FIG. 5 illustrates example graphs representing a performance of a machine learning model.
Figure 5:
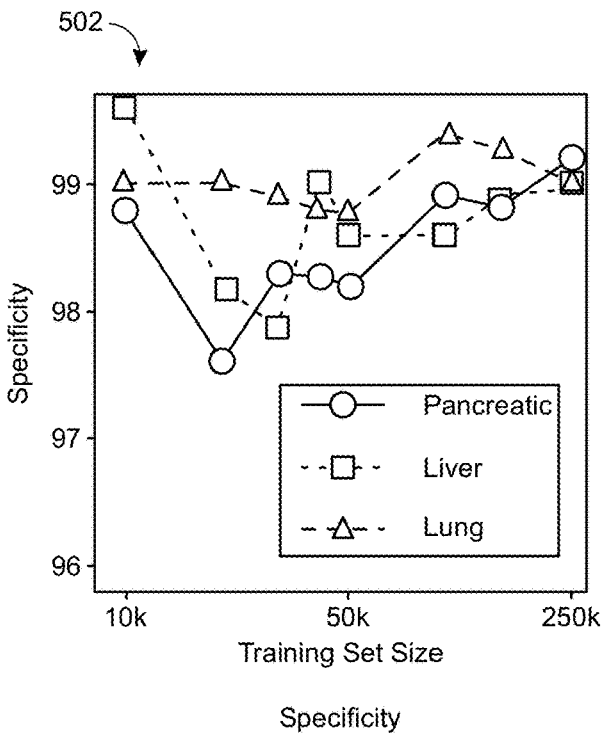

This machine learning model is evaluated with different amounts of available supervised finetuning labels. Graphs 500, 502 of FIG. 5 show the machine learning model's performance finetuned with different amounts of labels. The machine learning model maintains 99% specificity with as few as 10,000 training labels, with only 300 positives. The machine learning model sensitivity increases with more Specific implementation examples are now described. For tokenization and inputs, the following process can be used. In an example, each medical code is mapped into a unique index ranging from 0 to the total unique medical code numbers. Hence, no tokenization is needed as they are all treated as minimal unit tokens. The input sequence limit can be 2048 tokens. For patient records with record sequences exceeding the length limit of model, instead of truncation, the sequences are divided the into non-overlapping chunks as multiple training steps at the pretraining stage. For finetuning, the inputs longer than 2048 are truncated as they are a single input. The same methodology for text-based pretraining and finetuning can be used.

A Pythia architecture is an exemplary backbone of the machine learning model architecture. The Pythia model family is a suite of decoder-only autoregressive language models, ranging from 70M to 12B parameters, designed for scalable and consistent research. The feedforward architecture incorporates rotary embeddings for positional encoding, untied embedding layers for better interpretability, and parallelized flash attention for efficient training. Table 8 shows the model architecture, and Table 9 lists all hyperparameters used in pretraining and supervised fine-tuning on cancer screening tasks.

TABLE 8

Example Model Architectures

| Parameters | Num of layers | Dimension | Numofheads | Block size | Padding multiple |
|---|---|---|---|---|---|
| 70M | 6 | 512 | 8 | 2048 | 128 |
| 120M | 6 | 768 | 8 | 2048 | 128 |
| 160M | 12 | 768 | 12 | 2048 | 128 |
| 260M | 12 | 1024 | 16 | 2048 | 128 |
| 350M | 20 | 1024 | 16 | 2048 | 128 |
| 410M | 24 | 1024 | 16 | 2048 | 128 |
| 560M | 22 | 1280 | 10 | 2048 | 128 |
| 720M | 20 | 1536 | 12 | 2048 | 128 |
| 1B | 16 | 2048 | 8 | 2048 | 128 |
| 1.2B | 20 | 2048 | 16 | 2048 | 128 |
| 1.4B | 24 | 2048 | 16 | 2048 | 128 |
| 2.1B | 24 | 2560 | 16 | 2048 | 128 |
| 2.8B | 32 | 2560 | 32 | 2048 | 128 |

TABLE 9

Hyperparameter Configurations

| Hyperparameter | Pretraining | Supervised Fine-tuning |
|---|---|---|
| Learning Rate | 6e-6 for model size 1B; else 1e-5 | |
| Optimizer | AdamW | |
| Adamϵ | 1e-8 | |
| Adam Betas (/31, /32) | (0.9, 0.999) | |
| Weight decay | 0.01 | |
| Gradient Norm | 0.1 | |
| Batch Size | 64 | 128 |
| Epochs | | 5 |
| Warmup percentage | 0.1 | 0.1 |

Figure 6:
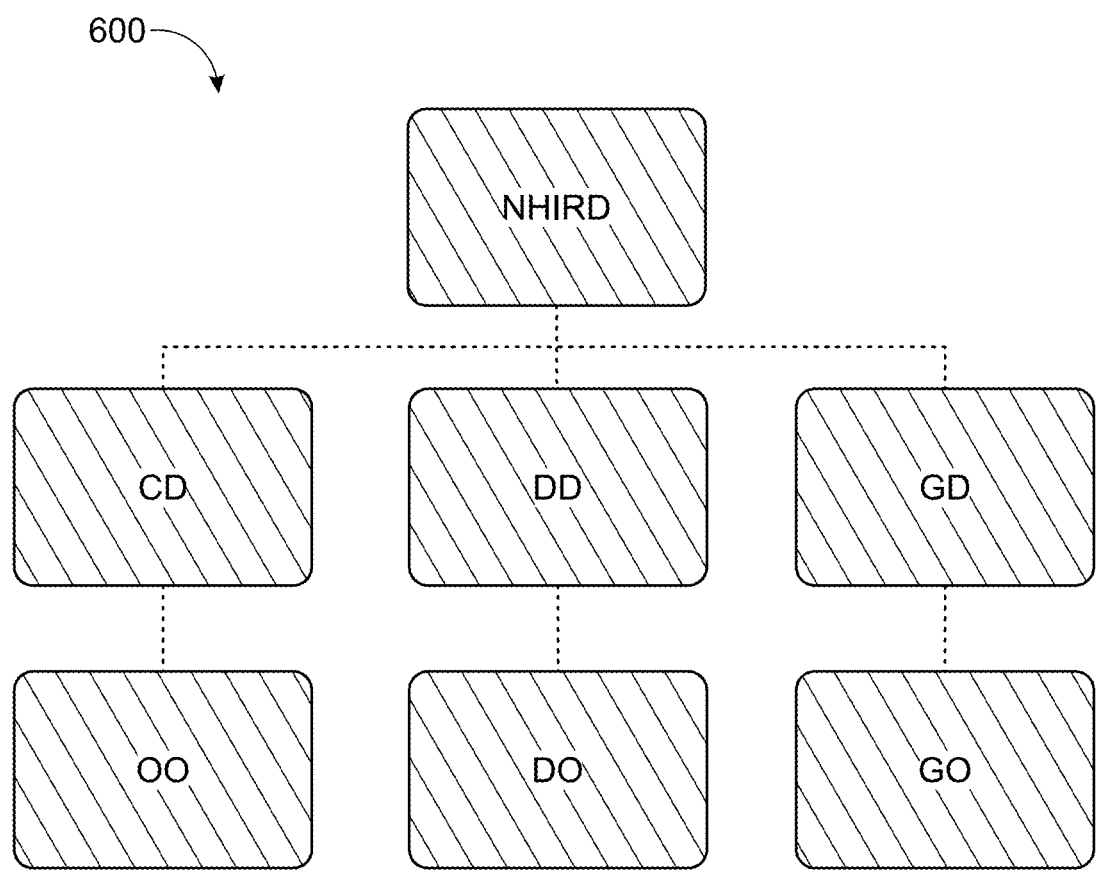
FIG. 6 illustrates example relationships between input data records.
Figure 7:
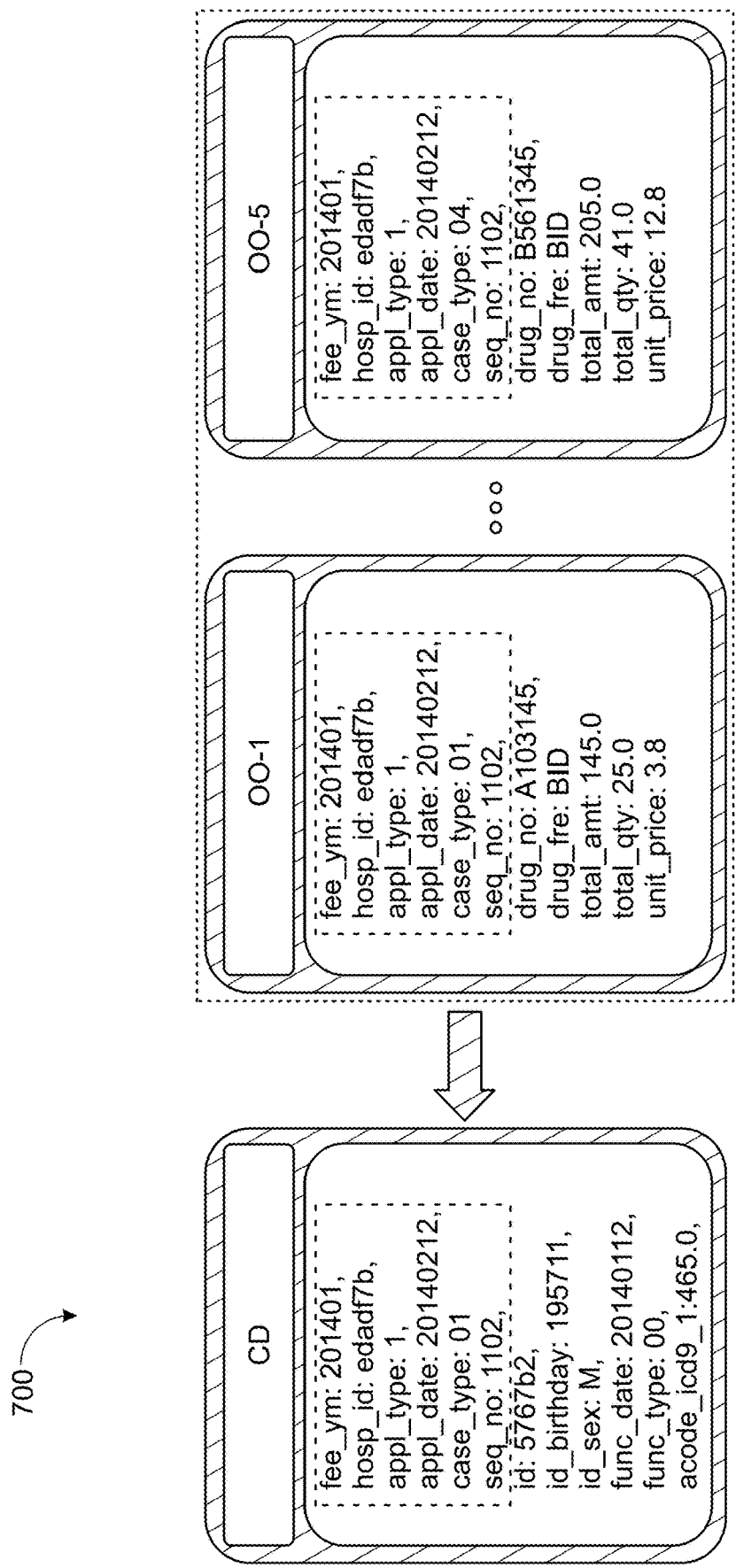
FIG. 7 illustrates examples of data records.
Figure 8:
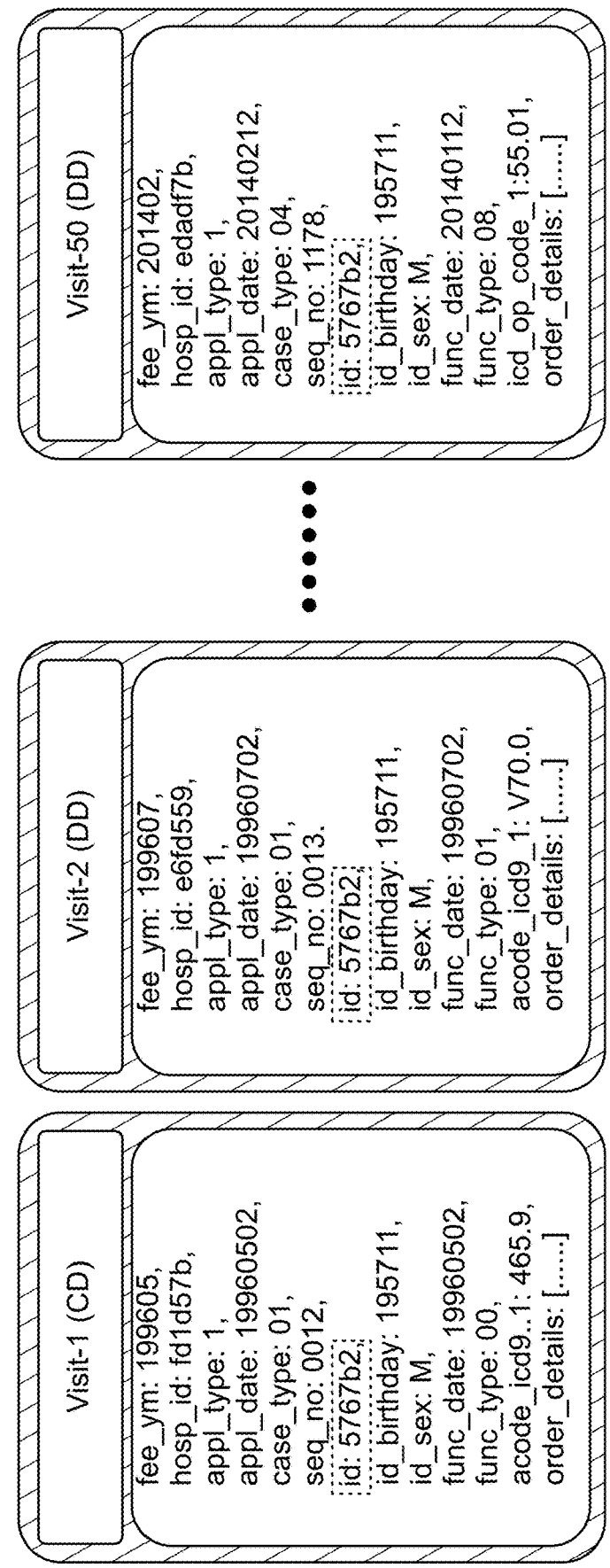
FIG. 8 illustrates examples of data records.

FIG. 6 illustrates example relationships between input data records. Each single visit in the figure, e.g., CD, DD, and GD, associates more than one order detail record from OO, DO, and GO (one to many relationship). To create a sequential medical history for each patient, all visits are aggregated with their associated order details by joining CD with OO, DD with DO, and GD with GO. FIG. 7 shows the join process 700 on CD with OO. After that, visits are aggregated for each individual 4 million patients by their patient IDs and sorted in chronological order. FIG. 8 illustrates example records 800 representing a sample patient record after the aggregation on all visits.

Figure 9:
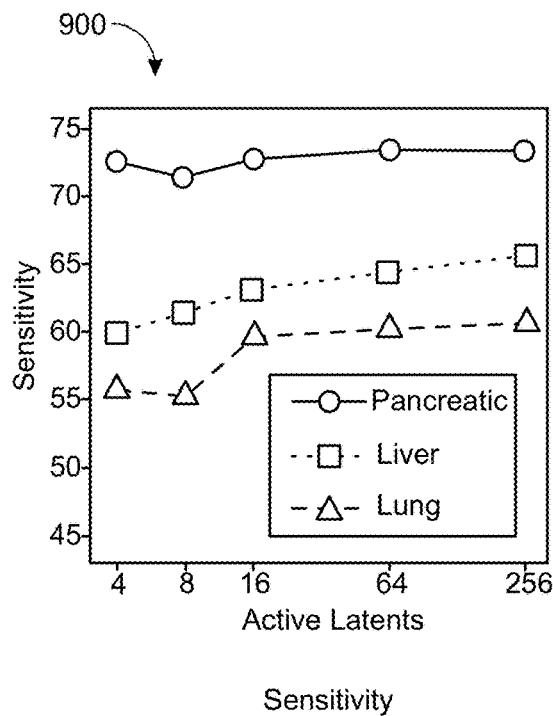
FIG. 9 illustrates example graphs representing a performance of a machine learning model.
Figure 9:
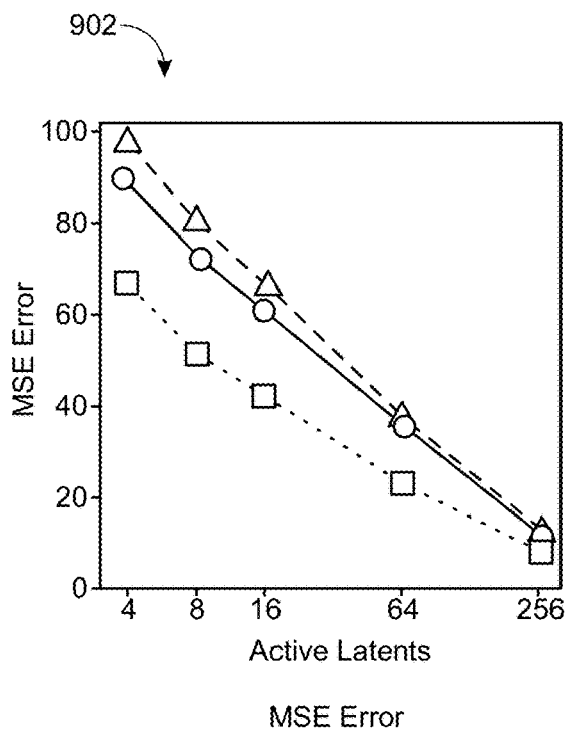

FIG. 9 illustrates example graphs representing a performance of a machine learning model. Specifically, graphs 900, 902 show evaluation results for a cancer screening task of a sparse autoencoder.

As discussed previously, the machine learning models described herein can be applied to different disease conditions in patients other than cancer. Table 10 shows an example of using the machine learning models described herein to screen for cardiovascular anomalies.

TABLE 10

Heart attack and stroke screening performance evaluation with pretrained compute-optimal model across different scales and compute budgets

| Model | FLOPs | F1 (Macro) | Accuracy | AUC | AUPRC | Specificity | Sensitivity |
|---|---|---|---|---|---|---|---|
| Heart Attack, Positive/Negative (Ratio): 10205/429248 (2.38%) | | | | | | | |
| XGBoost | | 0.734 | 0.982 | 0.953 | 0.554 | 0.997 | 0.357 |
| LightGBM | | 0.742 | 0.982 | 0.957 | 0.575 | 0.997 | 0.375 |
| EHR-FM-160M | 1e18 | 0.771 | 0.981 | 0.951 | 0.579 | 0.992 | 0.508 |
| EHR-FM-410M | 2e19 | 0.775 | 0.98 | 0.935 | 0.558 | 0.991 | 0.516 |
| EHR-FM-720M | 4e19 | 0.777 | 0.981 | 0.935 | 0.576 | 0.992 | 0.522 |
| EHR-FM-1B | 2e20 | 0.775 | 0.98 | 0.95 | 0.58 | 0.991 | 0.538 |
| Stroke, Positive/Negative (Ratio): 21815/625873 (3.49%) | | | | | | | |
| XGBoost | | 0.84 | 0.982 | 0.975 | 0.765 | 0.995 | 0.599 |
| LightGBM | | 0.854 | 0.983 | 0.977 | 0.788 | 0.995 | 0.646 |
| CATCH-FM-160M | 1e18 | 0.873 | 0.984 | 0.982 | 0.827 | 0.994 | 0.714 |
| CATCH-FM-410M | 2e19 | 0.873 | 0.984 | 0.982 | 0.827 | 0.994 | 0.714 |
| CATCH-FM-720M | 4e19 | 0.878 | 0.985 | 0.983 | 0.834 | 0.994 | 0.727 |
| CATCH-FM-1B | 2e20 | 0.874 | 0.984 | 0.974 | 0.785 | 0.992 | 0.755 |

Figure 10:
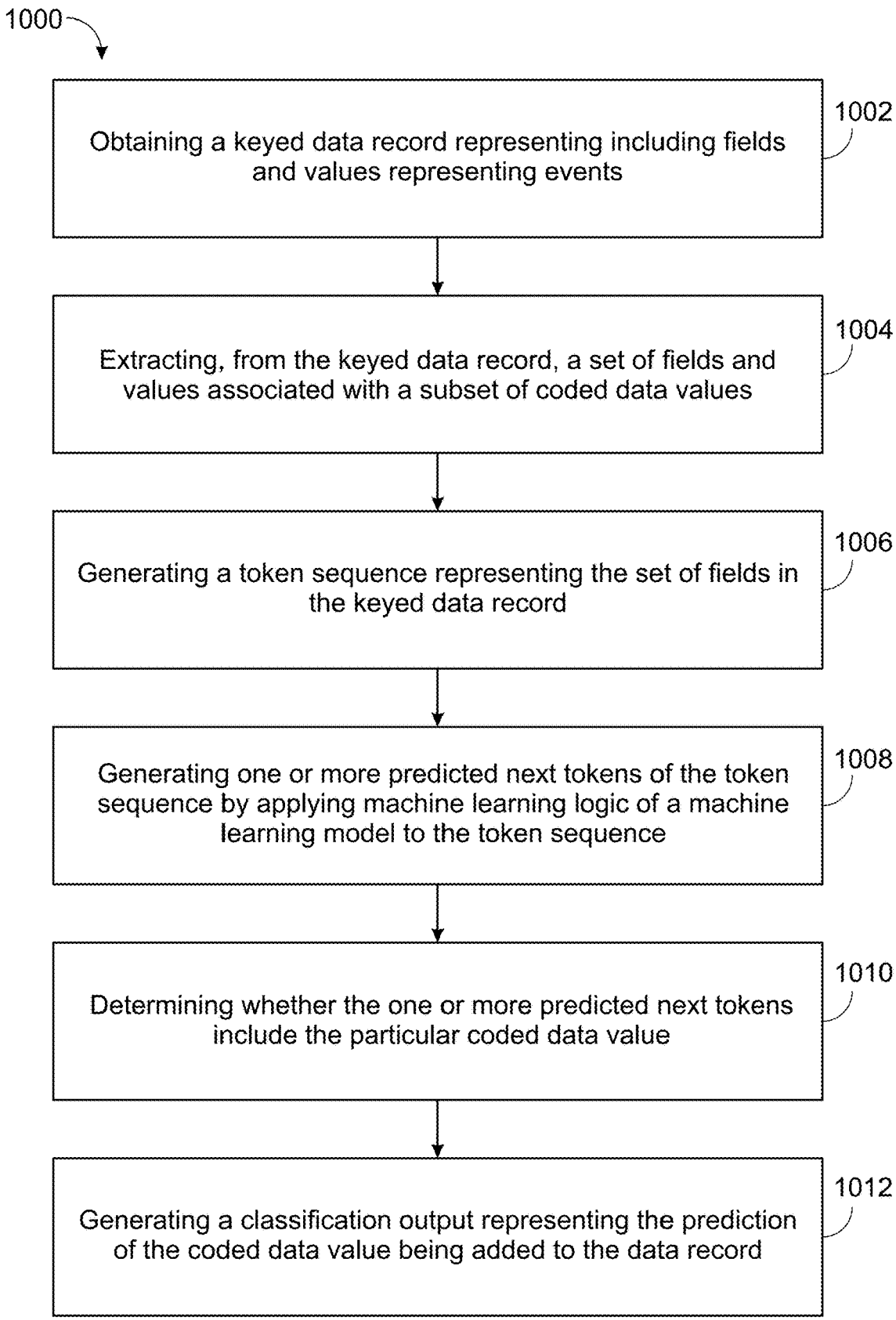
FIG. 10 illustrates an example process.

FIG. 10 illustrates an example process 1000 for generating a high-fidelity prediction for an addition of a coded data value to a data record. The process includes obtaining (1002) a keyed data record including fields and values representing events and extracting (1004), from the keyed data record, a set of fields and values associated with a subset of coded data values. The process 1000 includes generating (1006) a token sequence representing the set of fields in the keyed data record, a first token of the token sequence representing an event, and a second token representing a coded data value associated with the event of the first token, the first token and the second token being associated with each other in the sequence of tokens. The process 1000 includes generating (1008) one or more predicted next tokens of the token sequence by applying machine learning logic of a machine learning model to the token sequence, the machine learning model being trained using a tokenized set of data records each including a particular coded data value. The process 1000 includes determining (1010) whether the one or more predicted next tokens include the particular coded data value. The process 1000 includes generating (1012) a classification output representing the prediction of the coded data value being added to the data record.

In some implementations, the prediction of the coded value being added to the data record represents a prediction of a presence or an absence of a disease condition in a patient, the disease condition corresponding to the coded data value. In some implementations, the process 1000 includes mitigating or preventing the disease condition in the patient based on the prediction by causing intervention, such as causing further testing to be performed on the patient (including invasive testing), causing imaging of a particular region of the patient, generating a diagnosis and treatment plan for the patient based on the disease, and so forth. For example, the treatment plan can specify a that cancer may be present in the patient and that surgery or chemotherapy should be initiated, the type of surgery or chemotherapy determination being based on the particular disease detected or predicted in the patient. In another example, a heart disease may be predicted, and a treatment plan of a stent, bypass surgery, or food and exercise regimen may be suggested. In another example, a stroke or aneurysm may be predicted, and imaging/surgery may be suggested in a corresponding location in the brain to prevent the stroke or aneurysm from occurring.

In some implementations, when the patient has the disease condition, the classification output is more than 99% likely to predict that the disease condition is present. In some implementations, when the patient does not have the disease condition the classification output is more than 50% likely to predict that the disease condition is not present.

In some implementations, the particular coded data value comprises an ICD code corresponding to at least one of pancreatic cancer, lung cancer, or liver cancer.

In some implementations, the process 1000 includes selecting the particular coded value. The process 1000 includes selecting the machine learning model for application to the token sequence based on the selected particular coded value, the machine learning model being one of a set of machine learning models that are each trained using a unique set of data records comprising a corresponding particular coded data value.

In some implementations, the process 1000 includes receiving, for a key associated with the keyed data record, a set of additional data that is independent of a data record. In some implementations, the process 1000 includes generating an additional token representing the set of additional data. In some implementations, the process 1000 includes adding the additional token to the token sequence at a particular position among the tokens of the token sequence. In some implementations, the process 1000 includes generating the one or more predicted next tokens based on the token sequence including the additional token.

In some implementations, the set of additional data comprises a set of sensor data. In some implementations, the set of sensor data is generated by a wearable device, and wherein additional tokens are added to the token sequence on a periodic basis.

In some implementations, the particular coded data value comprises an ICD code corresponding to at least one of pancreatic cancer, lung cancer, or liver cancer. In some implementations, the particular coded data value comprises an ICD code corresponding to a heart condition. In some implementations, the machine learning model comprises a transform decoder.

In some implementations, generating the one or more next tokens comprises an autoregressive next-token prediction.

In some implementations, a monitoring system is configured for determining a presence or absence of anomalies in an entity for prevention or mitigation the anomalies, such as for performing the process 1000. In some implementations, the monitoring system includes one or more sensors configured to generate operational data describing operation of components of an entity and a computing system comprising one or more processors in communication with the one or more sensors such that the computing system can receive data from the one or more sensors and/or send commands to change the operation(s) of the components of the entity with control signal(s). The one or more processors can be configured to perform operations comprising receiving the operational data from the one or more sensors; generating, based on the operational data, a keyed data record including fields and values representing events that describe operation of the components of the entity; extracting, from the keyed data record, a set of fields and values associated with a subset of coded data values; generating a token sequence representing the set of fields in the keyed data record, a first token of the token sequence representing an event, and a second token representing a coded data value associated with the event of the first token, the first token and the second token being associated with each other in the sequence of tokens; generating one or more predicted next tokens of the token sequence by applying machine learning logic of a machine learning model to the token sequence, the machine learning model being trained using a tokenized set of data records each including a particular coded data value; determining whether the one or more predicted next tokens include the particular coded data value; and generating a classification output representing the prediction of the coded data value being added to the data record.

In some implementations, the prediction of the coded value being added to the data record represents a prediction of a presence or an absence of an anomaly in operation of a component of an entity associated with the data record, the anomaly corresponding to the coded data value.

In some implementations, the operations further comprise, when the prediction indicates a presence of an anomaly, causing mitigation or prevention of the anomaly by changing an operation of a component of the entity. In some implementations, changing an operation of a component of the entity comprises rebalancing a processing load among computing devices of the entity. In some implementations, changing an operation of a component of the entity comprises quarantining data associated with a component of the entity. In some implementations, changing an operation of a component of the entity comprises quarantining data associated with a component of the entity.

In some implementations, the operations comprise selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the operations comprise receiving, for a key associated with the keyed data record, a set of additional data that is independent of a data record; generating an additional token representing the set of additional data; adding the additional token to the token sequence at a particular position among the tokens of the token sequence; and generating the one or more predicted next tokens based on the token sequence including the additional token. In some implementations, the set of additional data comprises a set of sensor data, and wherein the set of sensor data is generated by a wearable device, and wherein additional tokens are added to the token sequence on a periodic basis.

In some implementations, a data processing method for generating a high-fidelity prediction for an addition of a coded data value to a data record includes obtaining a keyed data record including fields and values representing events; extracting, from the keyed data record, a set of fields and values associated with a subset of coded data values; generating a token sequence representing the set of fields in the keyed data record, a first token of the token sequence representing an event, and a second token representing a coded data value associated with the event of the first token, the first token and the second token being associated with each other in the sequence of tokens; generating one or more predicted next tokens of the token sequence by applying machine learning logic of a machine learning model to the token sequence, the machine learning model being trained using a tokenized set of data records each including a particular coded data value; determining whether the one or more predicted next tokens include the particular coded data value; and generating a classification output representing the prediction of the coded data value being added to the data record.

In some implementations, the prediction of the coded value being added to the data record represents a prediction of a presence or an absence of an anomaly in operation of a component of an entity associated with the data record, the anomaly corresponding to the coded data value.

In some implementations, when the anomaly is present in the operation of the component, the classification output is more than 99% likely to predict that the anomaly is present.

In some implementations, when the anomaly is not present in the operation of the component, the classification output is more than 50% likely to predict that the anomaly is not present.

In some implementations, the particular coded data value comprises an error code.

In some implementations, the particular coded data value represents a setting or configuration of a component of a computing system or control system.

In some implementations, the process includes selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the process includes receiving, for a key associated with the keyed data record, a set of additional data that is independent of a data record; generating an additional token representing the set of additional data; adding the additional token to the token sequence at a particular position among the tokens of the token sequence; and generating the one or more predicted next tokens based on the token sequence including the additional token.

In some implementations, the machine learning model comprises a transform decoder.

In some implementations, generating the one or more next tokens comprises an autoregressive next-token prediction.

Figure 11:
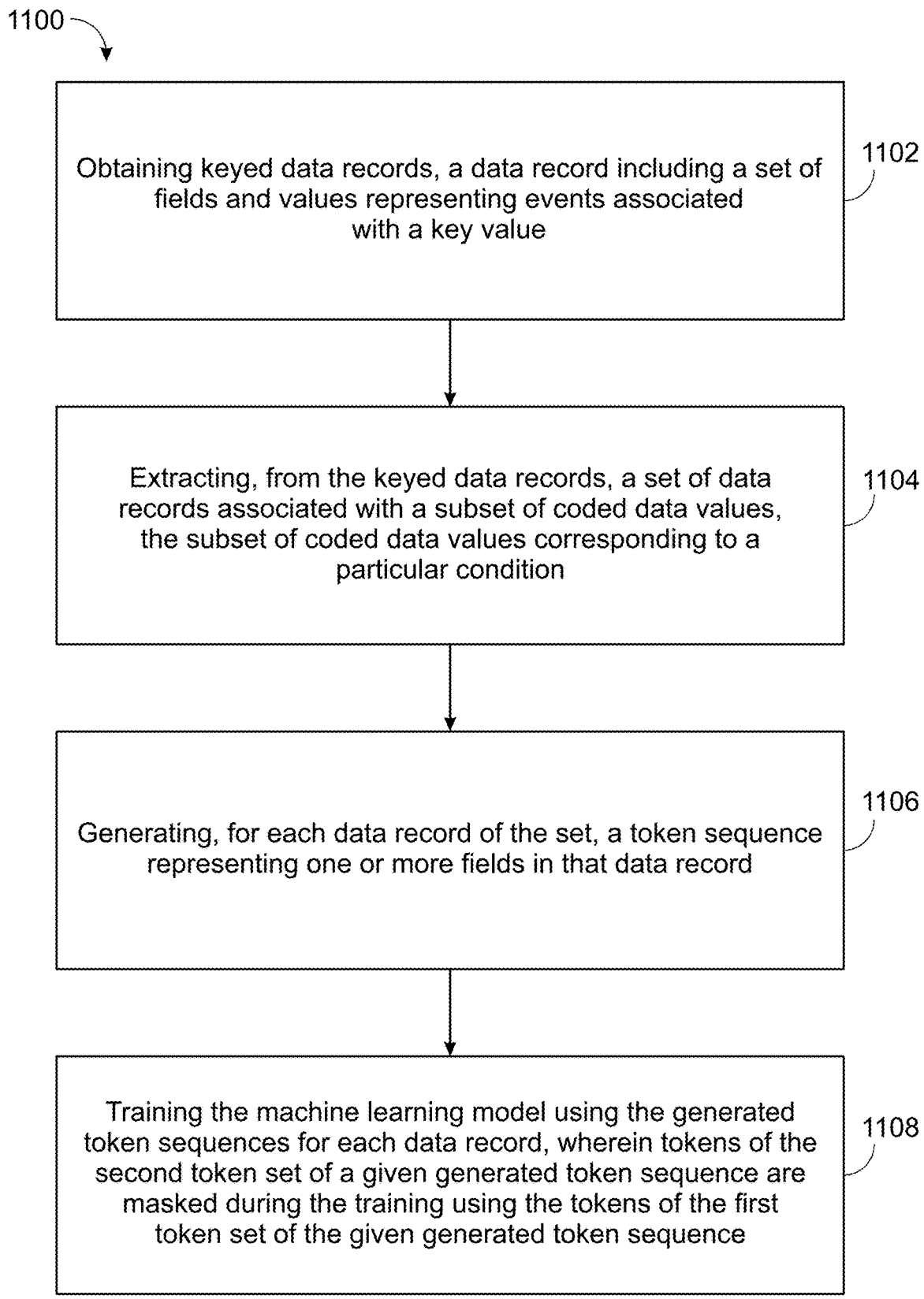
FIG. 11 illustrates an example process.

FIG. 11 illustrates an example process 1100 for pretraining a machine learning model with a set of scarcely labeled data. The process 1100 includes obtaining (1102) keyed data records, a data record including a set of fields and values representing events associated with a key value. The process 1100 includes extracting (1104), from the keyed data records, a set of data records associated with a subset of coded data values, the subset of coded data values corresponding to a particular condition. The process 1100 includes generating (1106), for each data record of the set, a token sequence representing one or more fields in that data record, a first token of the token sequence representing a first event, and a second token representing a coded data value associated with the first event of the first token, the first token and the second token being associated with each other in the sequence of tokens, the first and second tokens representing a first token set, and wherein the token sequence includes a second token set corresponding to a second event. The process 1100 includes training (1108) the machine learning model using the generated token sequences for each data record, wherein tokens of the second token set of a given generated token sequence are masked during the training using the tokens of the first token set of the given generated token sequence, the trained machine learning model configured to generate a predicted next token indicative of a presence or absence of an anomaly in an entity associated with the keyed data records.

In some implementations, the process 1100 includes applying the trained machine learning model to a set of keyed data records associated with a given entity when the keyed data records include the coded data value. In some implementations, the process 1100 includes predicting the presence or the absence of the anomaly in the given entity.

In some implementations, the tokens of the second token set of the given generated token sequence being masked are associated with the anomaly, and wherein the machine learning model is trained to predict the anomaly using different instances of token sequences including the coded data value.

In some implementations, the entity comprises a computing system, and wherein the anomaly comprises a load balancing imbalance. In some implementations, the process 1100 includes causing mitigation of the anomaly by rebalancing a processing load among computing devices of the computing system.

Figure 12:
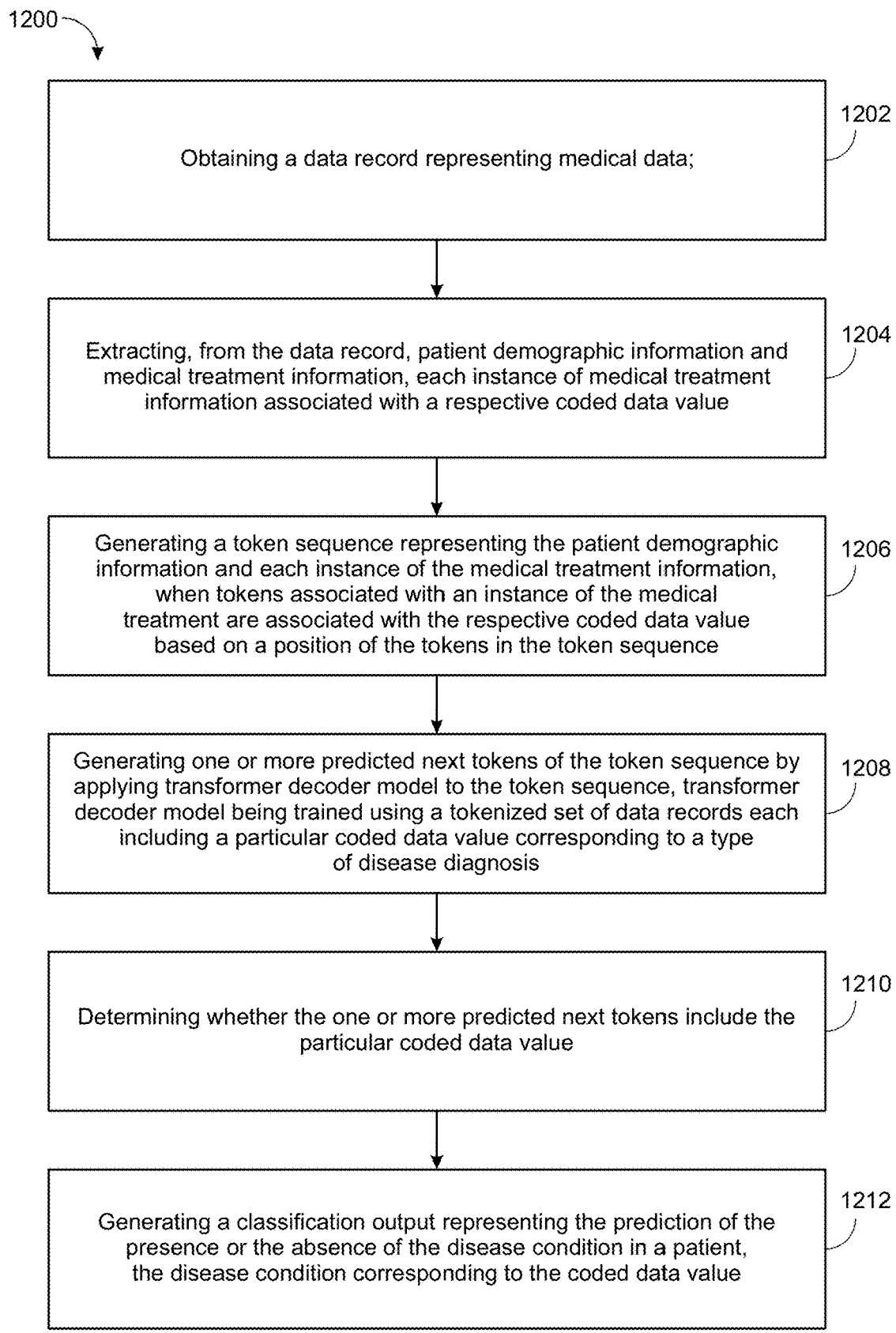
FIG. 12 illustrates an example process.

FIG. 12 illustrates an example process 1200 for high fidelity prediction of a presence or absence of a disease condition in a patient. In some implementations, the process 1200 includes obtaining (1202) a data record representing medical data. In some implementations, the process 1200 includes extracting (1204), from the data record, patient demographic information and medical treatment information, each instance of medical treatment information associated with a respective coded data value. In some implementations, the process 1200 includes generating (1206) a token sequence representing the patient demographic information and each instance of the medical treatment information, when tokens associated with an instance of the medical treatment are associated with the respective coded data value based on a position of the tokens in the token sequence. In some implementations, the process 1200 includes generating (1208) one or more predicted next tokens of the token sequence by applying transformer decoder model to the token sequence, transformer decoder model being trained using a tokenized set of data records each including a particular coded data value corresponding to a type of disease diagnosis. In some implementations, the process 1200 includes determining (1210) whether the one or more predicted next tokens include the particular coded data value. In some implementations, the process 1200 includes generating (1212) a classification output representing the prediction of the presence or the absence of the disease condition in a patient, the disease condition corresponding to the coded data value.

In some implementations, when the patient has the disease condition, the classification output is more than 99% likely to predict that the disease condition is present. In some implementations, when the patient does not have the disease condition the classification output is more than 50% likely to predict that the disease condition is not present.

In some implementations, the particular coded data value comprises an ICD code corresponding to at least one of pancreatic cancer, lung cancer, or liver cancer.

In some implementations, the process 1200 includes selecting the particular coded value; and selecting the machine learning model for application to the token sequence based on the selected particular coded value, the machine learning model being one of a set of machine learning models that are each trained using a unique set of data records comprising a corresponding particular coded data value.

In some implementations, the process 1200 includes receiving, for a key associated with the keyed data record, a set of additional data that is independent of a data record. In some implementations, the process 1200 includes generating an additional token representing the set of additional data. In some implementations, the process 1200 includes adding the additional token to the token sequence at a particular position among the tokens of the token sequence. In some implementations, the process 1200 includes generating the one or more predicted next tokens based on the token sequence including the additional token.

In some implementations, the set of additional data comprises a set of sensor data. In some implementations, the set of sensor data is generated by a wearable device, and wherein additional tokens are added to the token sequence on a periodic basis. In some implementations, the particular coded data value comprises an ICD code corresponding to at least one of pancreatic cancer, lung cancer, or liver cancer. In some implementations, the particular coded data value comprises an ICD code corresponding to a heart condition. In some implementations, the machine learning model comprises a transform decoder. In some implementations, generating the one or more next tokens comprises an autoregressive next-token prediction.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the monitoring system 102 can be implemented using digital electronic circuitry, or in computer software, firmware, or hardware, or in combinations of one or more of them. In another example, the processes 1000, 1100, and/or 1200, can be implemented using digital electronic circuitry, or in computer software, firmware, or hardware, or in combinations of one or more of them.

Some implementations described in this specification (e.g., the tokenizer engine 104, the model selection engine 106, the prediction engine 108, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, such as one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the tokenizer engine 104, the model selection engine 106, and/or the prediction engine 108 a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A monitoring system for determining a presence or absence of anomalies in an entity for prevention or mitigation the anomalies, the monitoring system comprising:
   one or more sensors configured to generate operational data describing operation of components of an entity; and
   a computing system comprising one or more processors in communication with the one or more sensors, the one or more processors configured to perform operations comprising:
   receiving the operational data from the one or more sensors;
   generating, based on the operational data, a keyed data record including fields and values representing events that describe operation of the components of the entity;
   extracting, from the keyed data record, a set of fields and values associated with a subset of coded data values;
   generating a token sequence representing the set of fields in the keyed data record, a first token of the token sequence representing an event, and a second token representing a coded data value associated with the event of the first token, the first token and the second token being associated with each other in the sequence of tokens;
   generating one or more predicted next tokens of the token sequence by applying machine learning logic of a machine learning model to the token sequence, the machine learning model being trained using a tokenized set of data records each including a particular coded data value;
   determining whether the one or more predicted next tokens include the particular coded data value; and
   generating a classification output representing the prediction of the coded data value being added to the data record.

2. The monitoring system of claim 1, wherein the prediction of the coded value being added to the data record represents a prediction of a presence or an absence of an anomaly in operation of a component of an entity associated with the data record, the anomaly corresponding to the coded data value.

3. The monitoring system of claim 1, the operations further comprising:
   when the prediction indicates a presence of an anomaly, causing mitigation or prevention of the anomaly by changing an operation of a component of the entity.

4. The monitoring system of claim 3, wherein changing an operation of a component of the entity comprises rebalancing a processing load among computing devices of the entity.

5. The monitoring system of claim 3, wherein changing an operation of a component of the entity comprises quarantining data associated with a component of the entity.

6. The monitoring system of claim 3, wherein changing an operation of a component of the entity comprises quarantining data associated with a component of the entity.

7. The monitoring system of claim 1, further comprising:
   selecting the particular coded value; and
   selecting the machine learning model for application to the token sequence based on the selected particular coded value, the machine learning model being one of a set of machine learning models that are each trained using a unique set of data records comprising a corresponding particular coded data value.

8. The monitoring system of claim 1, further comprising:
   receiving, for a key associated with the keyed data record, a set of additional data that is independent of a data record;
   generating an additional token representing the set of additional data;

adding the additional token to the token sequence at a particular position among the tokens of the token sequence; and generating the one or more predicted next tokens based on the token sequence including the additional token.

9. The monitoring system of claim 8, wherein the set of additional data comprises a set of sensor data, and wherein the set of sensor data is generated by a wearable device, and wherein additional tokens are added to the token sequence on a periodic basis.

10. A data processing method for generating a high-fidelity prediction for an addition of a coded data value to a data record, the method comprising:

obtaining a keyed data record including fields and values representing events;

extracting, from the keyed data record, a set of fields and values associated with a subset of coded data values;

generating a token sequence representing the set of fields in the keyed data record, a first token of the token sequence representing an event, and a second token representing a coded data value associated with the event of the first token, the first token and the second token being associated with each other in the sequence of tokens;

generating one or more predicted next tokens of the token sequence by applying machine learning logic of a machine learning model to the token sequence, the machine learning model being trained using a tokenized set of data records each including a particular coded data value;

determining whether the one or more predicted next tokens include the particular coded data value; and generating a classification output representing the prediction of the coded data value being added to the data record.

11. The method of claim 10, wherein the prediction of the coded value being added to the data record represents a prediction of a presence or an absence of an anomaly in operation of a component of an entity associated with the data record, the anomaly corresponding to the coded data value.

12. The method of claim 11, wherein when the anomaly is present in the operation of the component, the classification output is more than 99% likely to predict that the anomaly is present and wherein when the anomaly is not present in the operation of the component, the classification output is more than 50% likely to predict that the anomaly is not present.

13. The method of claim 10, wherein the particular coded data value comprises an error code or a setting or configuration of a component of a computing system or control system.

14. The method of claim 10, further comprising:
selecting the particular coded value; and
selecting the machine learning model for application to the token sequence based on the selected particular coded value, the machine learning model being one of a set of machine learning models that are each trained using a unique set of data records comprising a corresponding particular coded data value.

15. The method of claim 10, further comprising:
receiving, for a key associated with the keyed data record, a set of additional data that is independent of a data record;
generating an additional token representing the set of additional data;
adding the additional token to the token sequence at a particular position among the tokens of the token sequence; and
generating the one or more predicted next tokens based on the token sequence including the additional token.

16. The method of claim 10, wherein the machine learning model comprises a transform decoder and wherein generating the one or more next tokens comprises an autoregressive next-token prediction.

17. A method for pretraining a machine learning model with a set of scarcely labeled data, the method comprising:
obtaining keyed data records, a data record including a set of fields and values representing events associated with a key value;
extracting, from the keyed data records, a set of data records associated with a subset of coded data values, the subset of coded data values corresponding to a particular condition;
generating, for each data record of the set, a token sequence representing one or more fields in that data record, a first token of the token sequence representing a first event, and a second token representing a coded data value associated with the first event of the first token, the first token and the second token being associated with each other in the sequence of tokens, the first and second tokens representing a first token set, and wherein the token sequence includes a second token set corresponding to a second event;
training the machine learning model using the generated token sequences for each data record, wherein tokens of the second token set of a given generated token sequence are masked during the training using the tokens of the first token set of the given generated token sequence, the trained machine learning model configured to generate a predicted next token indicative of a presence or absence of an anomaly in an entity associated with the keyed data records.

18. The method of claim 17, further comprising:
applying the trained machine learning model to a set of keyed data records associated with a given entity when the keyed data records include the coded data value; and
predicting the presence or the absence of the anomaly in the given entity.

19. The method of claim 17, wherein the tokens of the second token set of the given generated token sequence being masked are associated with the anomaly, and wherein the machine learning model is trained to predict the anomaly using different instances of token sequences including the coded data value.

20. The method of claim 17, wherein the entity comprises a computing system, and wherein the anomaly comprises a load balancing imbalance, and wherein causing mitigation of the anomaly by rebalancing a processing load among computing devices of the computing system.

* * * * *